(12) United States Patent
Yilbas et al.

(10) Patent No.: US 8,155,933 B2
(45) Date of Patent: Apr. 10, 2012

(54) METHOD OF MODELING RESIDUAL STRESSES DURING LASER CUTTING

(75) Inventors: Bekir Sami Yilbas, Dhahran (SA); Abul Fazal M. Arif, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 462 days.

(21) Appl. No.: 12/453,873

(22) Filed: May 26, 2009

(65) Prior Publication Data

US 2010/0305910 A1 Dec. 2, 2010

(51) Int. Cl.
*G06F 17/50* (2006.01)
(52) U.S. Cl. .................... 703/2; 703/6; 702/32
(58) Field of Classification Search .............. 703/2, 7, 703/6; 702/32, 95–97; 372/35; 438/460; 219/121.72
See application file for complete search history.

(56) References Cited

U.S. PATENT DOCUMENTS

| | | | |
|---|---|---|---|
| 5,092,179 A | 3/1992 | Ferguson | |
| 6,631,647 B2 | 10/2003 | Seale | |
| 6,653,210 B2 * | 11/2003 | Choo et al. | 438/460 |
| 6,868,735 B2 | 3/2005 | Takahashi | |
| 6,871,162 B2 | 3/2005 | Futamura et al. | |
| 6,874,370 B1 | 4/2005 | Vachon | |
| 2002/0170896 A1* | 11/2002 | Choo et al. | 219/121.72 |
| 2003/0055577 A1* | 3/2003 | Gartner et al. | 702/32 |
| 2004/0056008 A1* | 3/2004 | Choo et al. | 219/121.69 |
| 2005/0271098 A1* | 12/2005 | Perry et al. | 372/35 |

FOREIGN PATENT DOCUMENTS

| | | |
|---|---|---|
| JP | 2004164453 A | 6/2004 |
| JP | 2004330212 A | 11/2004 |
| JP | 2005148016 A | 6/2005 |
| JP | 2007210528 A | 8/2007 |
| JP | 2007309704 A | 11/2007 |
| JP | 2008015780 A | 1/2008 |
| WO | WO2004048940 A3 | 6/2004 |

OTHER PUBLICATIONS

B.S. Yilbas and A.F.M. Arif, "Modelling of residual stresses during laser cutting of small-diameter holes", Proc. IMechE vol. 222 Part B: J. Engineering Manufacture, Dec. 2008.

* cited by examiner

*Primary Examiner* — Thai Phan
(74) *Attorney, Agent, or Firm* — Richard C. Litman

(57) ABSTRACT

The method of modeling residual stresses during laser cutting utilizes thermal diffusion and stress equations and a discretization numerical method to model temperature variation and residual stresses in a substrate material due to laser cutting therethrough of small-diameter holes.

6 Claims, 25 Drawing Sheets

METHOD OF MODELING RESIDUAL STRESSES DURING LASER CUTTING

BACKGROUND OF THE INVENTION

1. Field of the Invention

The present invention relates to numerical modeling and simulation methods, and particularly to a computerized method of modeling residual stresses during laser cutting that utilizes thermal diffusion and stress equations and a discretization numerical method to model temperature variation and residual stresses in a substrate material due to laser cutting therethrough of small diameter holes.

2. Description of the Related Art

In continuum mechanics, the concept of stress, introduced by Cauchy around 1822, is a measure of the average amount of force exerted per unit area of the surface on which internal forces act within a deformable body. In other words, stress is a measure of the intensity, or internal distribution, of the total internal forces acting within a deformable body across imaginary surfaces. These internal forces are produced between the particles in the body as a reaction to external forces applied on the body. External forces are either surface forces or body forces. Because the loaded deformable body is assumed as a continuum, these internal forces are distributed continuously within the volume of the material body; i.e. the stress distribution in the body is expressed as a piecewise continuous function of space coordinates and time.

For the simple case of a body which is axially loaded (e.g., a prismatic bar subjected to tension or compression by a force passing through its centroid), the stress σ, or intensity of the distribution of internal forces, can be obtained by dividing the total tensile or compressive force F by the cross-sectional area A upon which it is acting, or $$\sigma = \frac{F}{A}.$$

In this simplified case, the stress σ is represented by a scalar called engineering stress or nominal stress that represents an average stress over the area; i.e., the stress in the cross section is uniformly distributed. In general, however, the stress is not uniformly distributed over a cross section of a material body, and consequently the stress at a point on a given area is different than the average stress over the entire area. Therefore, it is necessary to define the stress not at a given area but at a specific point in the body. According to Cauchy, the stress at any point in an object, assumed to be a continuum, is completely defined by the nine components $\sigma_{ij}$ of a second order tensor known as the Cauchy stress tensor.

The yield strength or yield point of a material is defined in engineering and materials science as the stress at which a material begins to deform plastically. Prior to the yield point, the material will deform elastically and will return to its original shape when the applied stress is removed. Once the yield point is passed some fraction of the deformation will be permanent and non-reversible. In the three-dimensional space of the principal stresses ($\sigma_1$, $\sigma_2$, $\sigma_3$), an infinite number of yield points form together a yield surface.

Knowledge of the yield point is vital when designing a component, since it generally represents an upper limit to the load that can be applied. It is also important for the control of many materials production techniques such as forging, rolling, or pressing. In structural engineering, this is a soft failure mode, which does not normally cause catastrophic failure or ultimate failure unless it accelerates buckling.

The laser cutting process finds wide applications in industry, due to its precise operation, rapid processing, and the low heat-affected zone generated around the cut edges. The temperature rise in the irradiated region generates molten metal, and removal of the molten metal from the workpiece forms the cut edges. Although the temperature rise in the molten metal is higher than the melting temperature of the substrate material, temperature remains almost at the melting temperature at the kerf edges. This is due to heat transfer between the molten metal and the substrate material at the solid-liquid interface. Consequently, the cut edges cannot extend further into the solid substrate, and the size of the kerf width remains almost constant during the cutting process. Although temperature at the cut edge in the region of the laser-irradiated spot remains at the melting temperature of the substrate material, high temperature gradients within the neighboring solid phase can result. The high temperature gradient around the cut edges results in the development of thermal stresses during the cutting process.

Since these thermal stress levels exceed the elastic limit of the substrate material, residual stresses are developed along the cutting edge. This situation becomes severe for the cutting of relatively small-diameter holes in the substrate, which, in turn, influences the quality of the end product. Consequently, modeling and simulation of the laser cutting of small-diameter holes and the residual stress developed around the cut edges becomes essential.

Thus, a method of modeling residual stresses during laser cutting solving the aforementioned problems is desired.

SUMMARY OF THE INVENTION

The method of modeling residual stresses during laser cutting utilizes thermal diffusion and stress equations and a discretization numerical method to model temperature variation and residual stresses in a substrate material due to laser cutting therethrough of small-diameter holes. In the present method, laser cutting of small-diameter holes in mild steel substrates are modeled, and the stress levels in the region of the cut surfaces are calculated. The residual stresses are modeled to match empirically determined residual stresses in the region of the cut surfaces using an X-ray diffraction (XRD) technique.

The method includes the steps of: (a) establishing a set of variables u, t, T, x, y, z, ρ, $C_p$, Kxx, Kyy and Kzz, wherein the variable t represents time, the variable T represents temperature, the variables x, y and z represent Cartesian axes, ρ represents a density of a substrate material, $C_p$ represents a specific heat capacity of the substrate material, u is a scanning speed of a laser beam used to cut the substrate material, and Kxx, Kyy and Kzz respectively represent thermal conductivities of the substrate material along the x, y and z-axes; (b) calculating temperature variation in the substrate material due to laser cutting as:

$$\rho\frac{\partial(C_pT)}{\partial t} = \left[\frac{\partial}{\partial x}\left(K_{xx}\frac{\partial T}{\partial x}\right) + \frac{\partial}{\partial y}\left(K_{yy}\frac{\partial T}{\partial y}\right) + \frac{\partial}{\partial z}\left(K_{zz}\frac{\partial T}{\partial z}\right)\right] + \rho u\frac{\partial(C_pT)}{\partial y};$$

(c) establishing boundary conditions for the calculation of temperature variation; (d) applying a Fourier heat model to a differential control volume such that $$\rho\frac{\partial(C_pT)}{\partial t} + \{L\}^T\{q\} = u\frac{\partial}{\partial y}(\rho C_p T),$$

wherein $$\{L\} = \begin{Bmatrix} \frac{\partial}{\partial x} \\ \frac{\partial}{\partial y} \\ \frac{\partial}{\partial z} \end{Bmatrix}$$

is a vector operator and $\{q\}$ is a heat flux vector, wherein $\{q\} = -[D]\{L\}^T$, where $$[D] = \begin{bmatrix} K_{xx} & 0 & 0 \\ 0 & K_{yy} & 0 \\ 0 & 0 & K_{zz} \end{bmatrix};$$

(e) setting Kxx, Kyy and Kzz equal to a constant thermal conductivity K such that $$\frac{\partial}{\partial t}(\rho C_p T) = \{L\}^T[[D]\{L\}T] + u\frac{\partial}{\partial y}(\rho C_p T);$$

(f) calculating a strain energy due to thermal stresses within the substrate material as $\{\delta u\}^T \int_{vol}[B]^T[D][B]dv\{u\} = \{\delta u\}^T \int_{vol}[B]^T[D][\epsilon^{th}]dv$, wherein $\{\delta u\}^T$ is a vector representing a set of arbitrary virtual displacements, $[\epsilon^{th}]$ represents a thermal strain vector, [B] is a strain-displacement matrix and v represents a differential volume, wherein calculation of temperature variation and strain energy in the substrate material due to laser cutting is performed by discretization; and (g) displaying numerical results of the calculated temperature variation and strain energy in the substrate material due to laser cutting.

In the above, the boundary conditions for the calculation of temperature variation are set as $\{q\}^T\{\eta\} = h(T_s - T_0)$, wherein $\{\eta\}$ is a unit outward vector normal to a surface of the substrate material, h is a heat transfer coefficient, and $T_s$ and $T_0$ are surface and reference temperatures of the substrate material, respectively. Discretization is preferably performed using the finite element method.

Additionally, the calculation of strain energy includes calculation of $[K]\{u\} = \{F^{th}\}$, wherein $[K] = \int_{vol}[B]^T[D][B]dv$ and $\{F^{th}\} = \int_{vol}[B]^T[D][\epsilon^{th}]dv$ is an element thermal load vector. The thermal strain vector is calculated as $\{\epsilon^{th}\} = \{\alpha\}\Delta T$, where $\{\alpha\}$ is a vector of coefficients of thermal expansion.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of modeling residual stresses during laser cutting utilizes thermal diffusion and stress equations and a discretization numerical method to model temperature variation and residual stresses in a substrate material due to laser cutting therethrough of small-diameter holes. In the present method, laser cutting of small-diameter holes in mild steel substrates are modeled, and the stress levels in the region of the cut surfaces are calculated. The residual stresses are modeled to match empirically determined residual stresses in the region of the cut surfaces using an X-ray diffraction (XRD) technique.

Figure 1A:
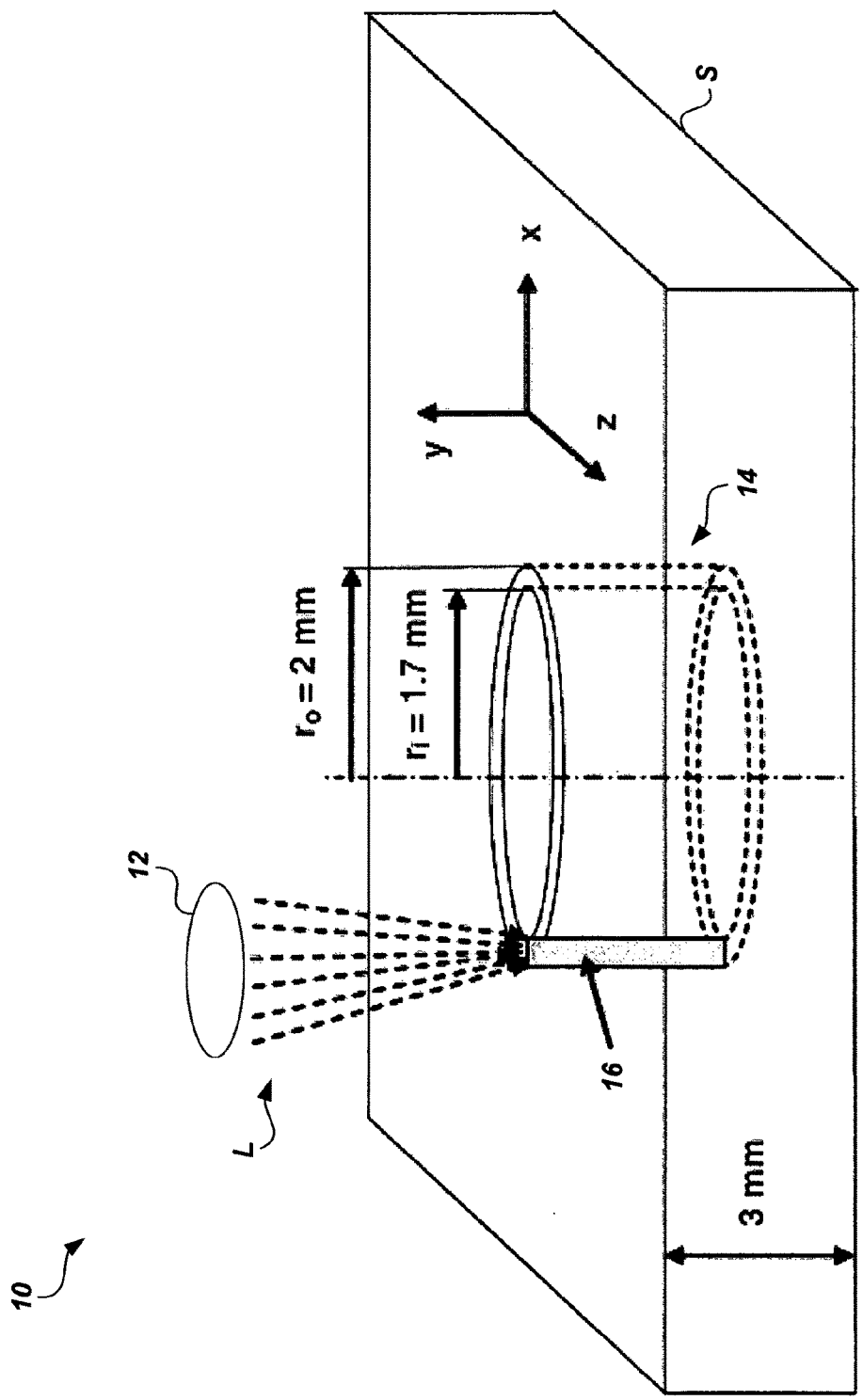
FIG. 1A is a diagrammatic view of a system for laser cutting of a substrate.

The method of modeling described below relates to a general laser-cutting system 10, such as that illustrated diagrammatically in FIG. 1A. In FIG. 1A, a substrate workpiece S is cut by laser light L, generated by any suitable type of cutting laser, to form a hole 14. Preferably, a pulsed laser is used, such as a $CO_2$ laser, for example, delivering a nominal output power of approximately 2000 W at a pulse mode with adjustable frequencies. The use of high-frequency pulsing provides quality cutting with a minimization of striation defects. The length of each laser pulse is preferably on the order of milliseconds, which is considerably shorter than the time required for completion of the laser cutting process. Therefore, in following analysis, it is assumed that the laser output power provides a continuous heating situation. Nitrogen, for example, may be used as an assisting gas. A 127 mm focal lens 12 may be used to focus the laser beam L. The laser cutting parameters are given below in Table I:

TABLE I

| Feed rate (m/s) | Power (W) | Frequency (Hz) | Nozzle Gap (mm) | Nozzle Diameter (mm) | Focus Diameter (mm) | $N_2$ Pressure (kPa) |
|---|---|---|---|---|---|---|
| 0.1 | 1500 | 300 | 1.5 | 1.5 | 0.3 | 600 |

Figure 1B:
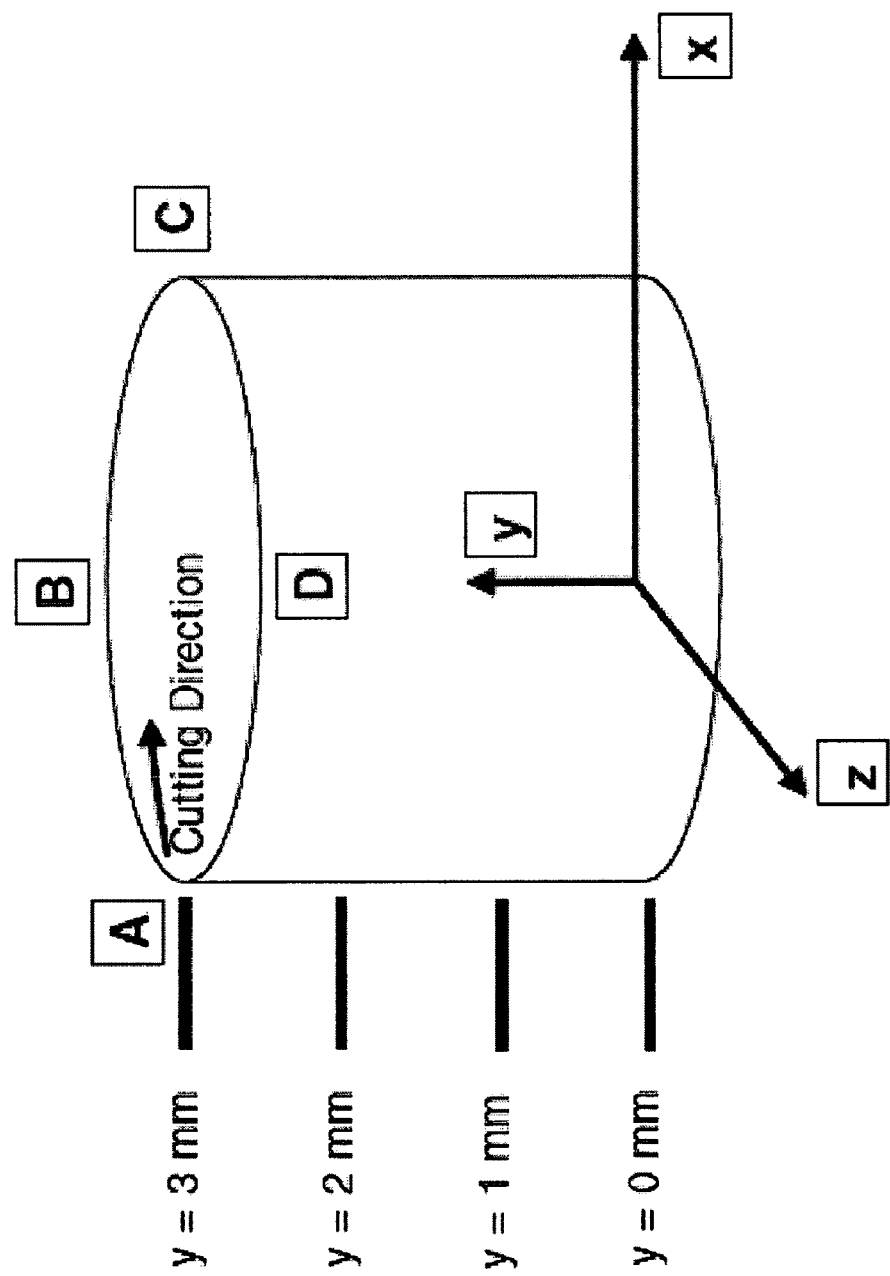
FIG. 1B is a diagrammatic view of a hole cut using the system of FIG. 1A.
Figure 1C:
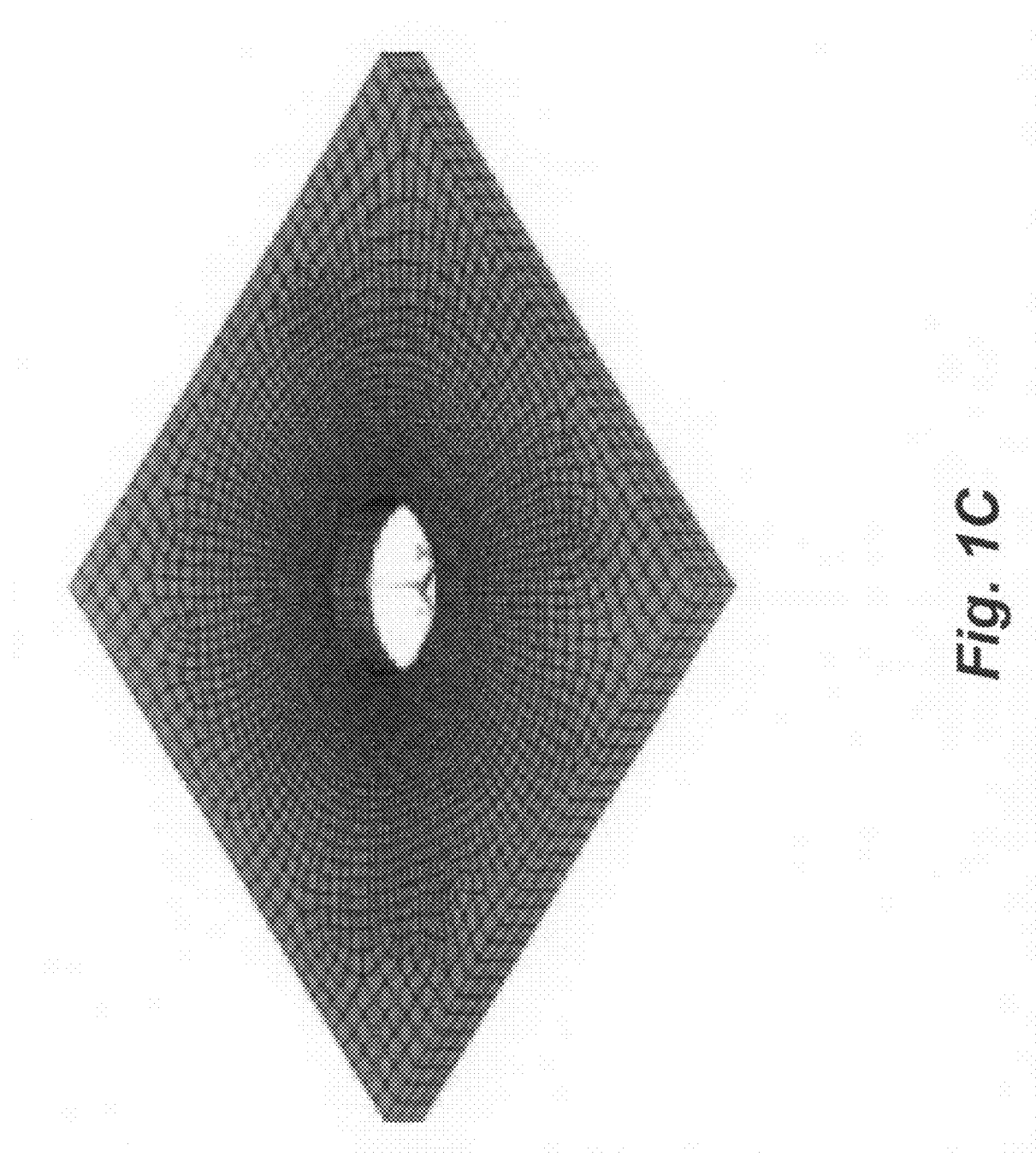
FIG. 1C illustrates a finite element mesh used in the method of modeling residual stresses during laser cutting.

In the exemplary system 10 (to be modeled by the present method, as described below), a substrate S having a thickness of approximately 3 mm is cut by focused laser beam L to form hole 14. The immediately heated volume is shown generally as 16, having a thickness of approximately 0.3 mm, forming a hole 14 defined by inner diameter $r_1$ of approximately 1.7 mm and outer diameter $r_o$ of approximately 2 mm. FIG. 1B illustrates four points A, B, C and D, to be used in calculations below, on the laser-cut hole 14, laid out along Cartesian x, y and z-axes. As will be described in greater detail below, the temperature and stress variations in the cutting process are modeled using a discrete numeric analysis, such as the Finite Element Method. FIG. 1C illustrates the finite element mesh used in the modeling simulation.

In order to compare the numeric model with actual experimental results, a scanning electron microscope and energy-dispersive spectroscopy may be used to obtain photomicrographs of the cross-section and surface of the workpieces after testing. XRD analysis may be performed using Mo $K_a$ radiation, with a typical setting of XRD being approximately 40 kV and 30 mA. It should be noted that the residual stress measured using the XRD technique provides data in the surface region of the specimens. This is due to the penetration depth of Mo $K_a$ radiation within the coating; i.e., the penetration depth is on the order of approximately 10-20 mm. The measurement relies on the stresses in the fine-grained polycrystalline structure of the substrate S. The position of the diffraction peak undergoes a shift as the specimen is rotated by an angle $\psi$. The magnitude of the shift is related to the magnitude of the residual stress. The relationship between the peak shift and the residual stress is given by:

$$\sigma = \frac{E}{(1+v)\sin^2\psi} \cdot \frac{(d_n - d_o)}{d_o} \quad (1)$$

where E is the Young's modulus of the substrate material, v is Poisson's ratio, $\psi$ is the tilt angle and $d_t$ represent the spacing measured at each tilt angle. If there are no shear strains present in the substrate S, the d spacing changes linearly with $\sin^2\psi$.

For the following analysis, the workpieces were prepared from carbon steel sheet with a 3 mm thickness, which was then cut into square plates with dimensions of 200 mm by 200 mm. The workpiece was cleaned chemically and ultrasonically prior to the laser hole cutting process. In order to compare the stress levels around the cut holes, two holes were cut by the laser with diameters of 4 mm and 8 mm, respectively.

The transient diffusion equation based on the Fourier heating model can be written in Cartesian coordinates as:

$$\rho\frac{\partial(C_p T)}{\partial t} = \left[\frac{\partial}{\partial x}\left(K_{xx}\frac{\partial T}{\partial x}\right) + \frac{\partial}{\partial y}\left(K_{yy}\frac{\partial T}{\partial y}\right) + \frac{\partial}{\partial z}\left(K_{zz}\frac{\partial T}{\partial z}\right)\right] + \rho u \frac{\partial(C_p T)}{\partial y} \quad (2)$$

where x, y, and z are the Cartesian axes, u is the scanning speed of the laser beam L, $\rho$ is the density of the substrate material, $C_p$ is the specific heat capacity of the substrate material, and $K_{xx}$, $K_{yy}$, $K_{zz}$ are the thermal conductivities of the substrate material along the three Cartesian axes, respectively. Uniform thermal conductivity is assumed, thus $K_{xx}$, $K_{yy}$, $K_{zz}$ are all set equal to the bulk thermal conductivity K of the substrate material. Additionally, T represents temperature and t represents time. It should be noted that the laser heating situation is considered to be a constant-temperature line heat source with radius a (laser beam radius at focused surface) in the x-y plane and thickness w along the z-axis. This setting represents the assumption that the kerf surface temperature is at the melting temperature of the substrate material along the z-axis in the x-y plane where the laser beam is located (see FIG. 1A). The adoption of the Fourier heat equation to a differential control volume yields $$\rho\frac{\partial(C_p T)}{\partial t} + \{L\}^T\{q\} = u\frac{\partial}{\partial y}(\rho C_p T) \quad (3)$$

where $$\{L\} = \begin{Bmatrix} \frac{\partial}{\partial x} \\ \frac{\partial}{\partial y} \\ \frac{\partial}{\partial z} \end{Bmatrix}$$

is a vector operator and $\{q\}$ is a heat flux vector that can be written in terms of thermal gradients as:

$$\{q\} = -[D]\{L\}^T \quad (4)$$

where $$[D] = \begin{bmatrix} K_{xx} & 0 & 0 \\ 0 & K_{yy} & 0 \\ 0 & 0 & K_{zz} \end{bmatrix}$$

is the conductivity matrix. Combining equations (3) and (4) yields:

$$\frac{\partial}{\partial t}(\rho C_p T) = \{L\}^T[[D]\{L\}T] + u\frac{\partial}{\partial y}(\rho C_p T). \quad (5)$$

The boundary conditions pertinent to the heating process are as follows. (1) At the free surface (in the x-y plane at z=0) a convective boundary is assumed. Therefore, the corresponding boundary condition is $\{q\}^T\{\eta\}=h(T_s-T_0)$, where $\{\eta\}$ is the unit outward normal vector, h is the heat transfer coefficient, and $T_s$ and $T_0$ are the surface and reference temperatures, respectively. (2) Additionally, at a distance far away from the surface in the x-y plane, the temperature becomes the same as the reference temperature. This yields the boundary condition of (at x and y=∞) $T=T_\infty$, where $T_0$ is specified. (3) Initially, the substrate material is assumed to be at the reference temperature $T_0$. Thus, the initial condition becomes, at t=0, $T=T_\infty$, where $T_0$ is specified.

From the principle of virtual work (PVW), a virtual (or very small) change of the internal strain energy $\delta U$ must be offset by an identical change in external work due to the applied loads $\delta V$. Considering the strain energy due to thermal stresses resulting from the constrained motion of a body during a temperature change, PVW yields:

$$\{\delta u\}^T\int_{vol}[B]^T[D][B]dv\{u\} = \{\delta u\}^T\int_{vol}[B]^T[D][\epsilon^{th}]dv \quad (6)$$

Noting that the $\{\delta u\}^T$ vector is a set of arbitrary virtual displacements common in all of the above terms, the condition required to satisfy the above equation reduces to:

$$[K]\{u\}=\{F^{th}\} \quad (7)$$

where $[K]=\int_{vol}[B]^T[D][B]dv$ is the element stiffness matrix, and $[B]$ is the strain-displacement matrix. Further, $\{F^{th}\}=\int_{vol}[B]^T[D][\epsilon^{th}]dv$ is the element thermal load vector, and $\{\epsilon^{th}\}=\{\alpha\}\Delta T$ is the thermal strain vector. $\{\alpha\}$ is the vector of coefficients of thermal expansion.

A coupled-field analysis was performed to determine the temperature distribution and the resulting thermal stresses in the workpiece using a finite element analysis code ANSYS. For modeling purposes, three-dimensional (3D) and transient finite element analysis was utilized. It should be noted that the thermal stress analysis is considered for only the solid phase of the laser-irradiated substrate material. Further, to incorporate the temporal variation in the thermal loading, the temperature predicted by equation (2) was used in the modeling. The coupling between the thermal and structural fields was accomplished by direct coupling (i.e., matrix coupling). A 3D, coupled-field, solid element (SOLID5) was used for the modeling. The finite element field has 3D magnetic, thermal, electric, piezoelectric, and structural field capability with limited coupling between the fields. The element has eight nodes with up to six degrees of freedom at each node. The mesh used in the simulations is shown in FIG. 1C.

It should be noted that the Cartesian coordinate system was used to generate the mesh, due to its relative simplicity. When used in structural analyses, the mesh has large deflection and stress stiffening capabilities. The analysis was extended to include elasto-plastic cases, in which case the residual stresses are predicted after considering the plastic analysis. The residual stress predicted corresponds to the von Mises stress after the end of the cooling cycle. The thermal and structural properties used in the current work are given in Table II below (illustrating variable properties used in the simulations for carbon steel ($v=0.3$ and $\rho=7700$ kg/m$^3$). In order to be consistent with the experiment, in the simulations, a workpiece thickness of 3 mm was used.

Figure 2:
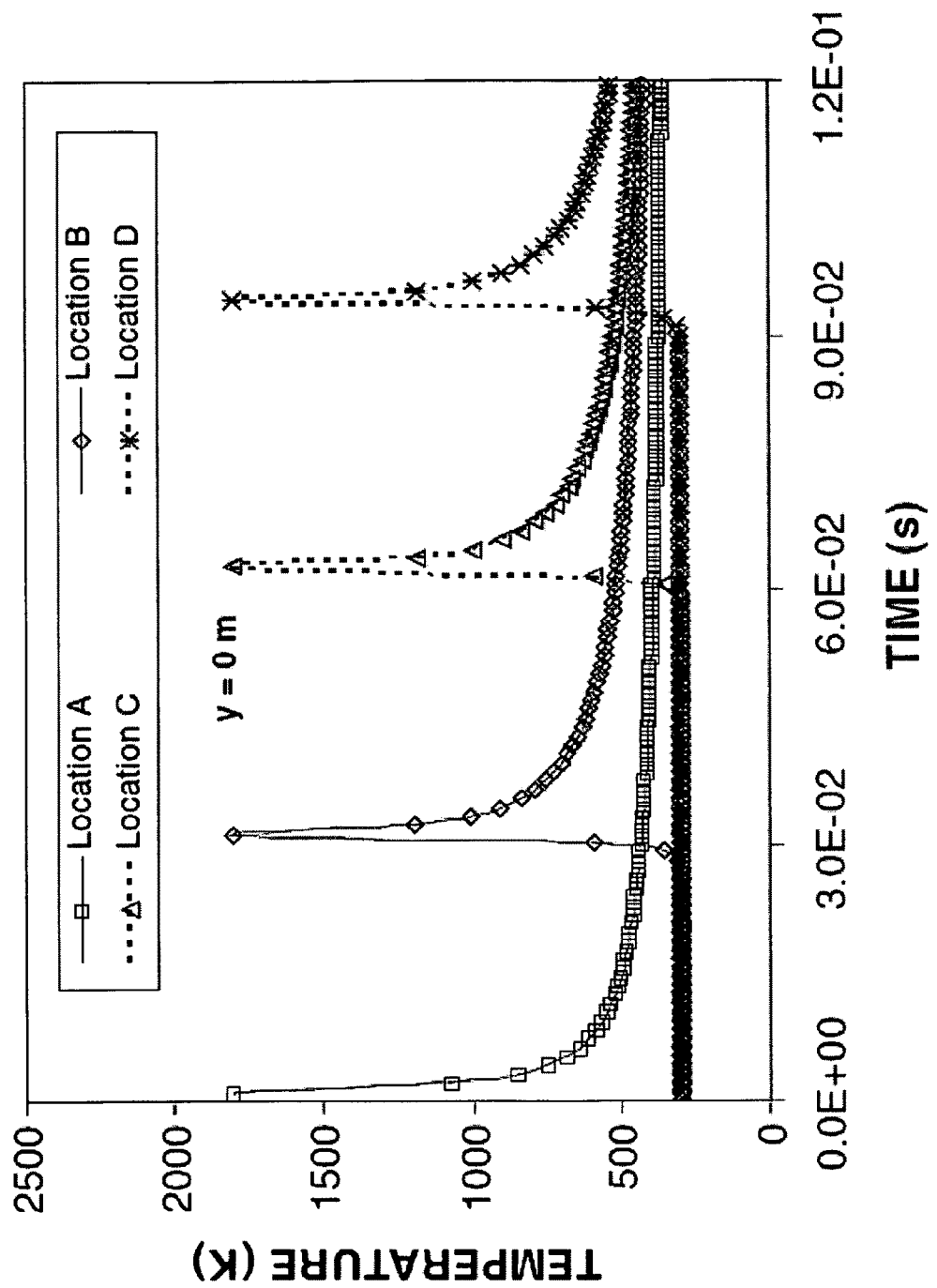
FIG. 2 is a graph illustrating temporal variation of temperature at a laser-cut hole surface at varying locations.

Laser hole cutting of mild steel sheet was modeled using the finite element method and the temperature and stress fields around the cut edges were predicted. An experiment resembling the simulation conditions was carried out to examine the residual stress formed around the cut edges. FIG. 2 shows the temporal variation of temperature at four locations A, B, C and D (depicted in FIG. 1B) around the cut surface at the top plane of the sample (y=0 m). It should be noted that the laser beam is considered as a line heat source and acts along the cut surface, consequently, a line heat source at constant temperature is assumed to resemble the laser cutting beam L. This is because the workpiece surface that is in contact with the laser beam remains at the melting temperature of the substrate material S.

At location A, where the cutting is initiated, temperature decays sharply when the line heat source passes the location at the hole circumference. A similar argument is true for the other locations (B, C, and D) at the hole circumference, although the decay rate of temperature at different locations on the hole circumference changes slightly. This is due to the pre-heating by the laser beam before it reaches the corresponding locations at the hole circumference. It should be noted that the heat transfer takes place around the heat source in the cutting section. The region behind the heat source (the region scanned by the laser beam during the heat source movement) is subjected to less conduction heat loss, due to the lower temperature gradient, than that in the region ahead of the heat source. This situation slightly modifies the temporal decay of temperature when the cutting progresses.

Figure 3:
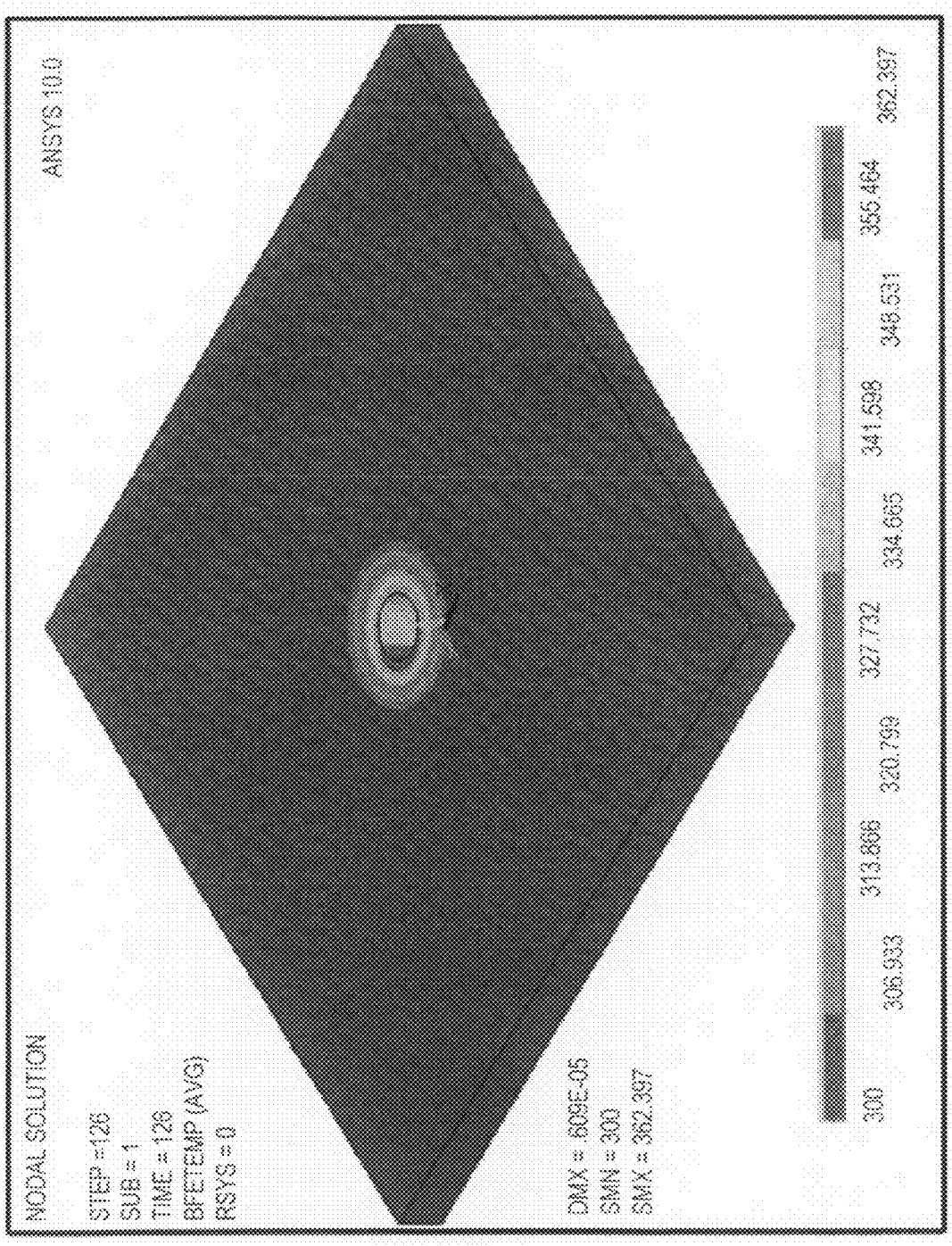
FIG. 3 illustrates temperature distribution about the laser-cut hole surface at the completion of the laser cutting.
Figure 4:
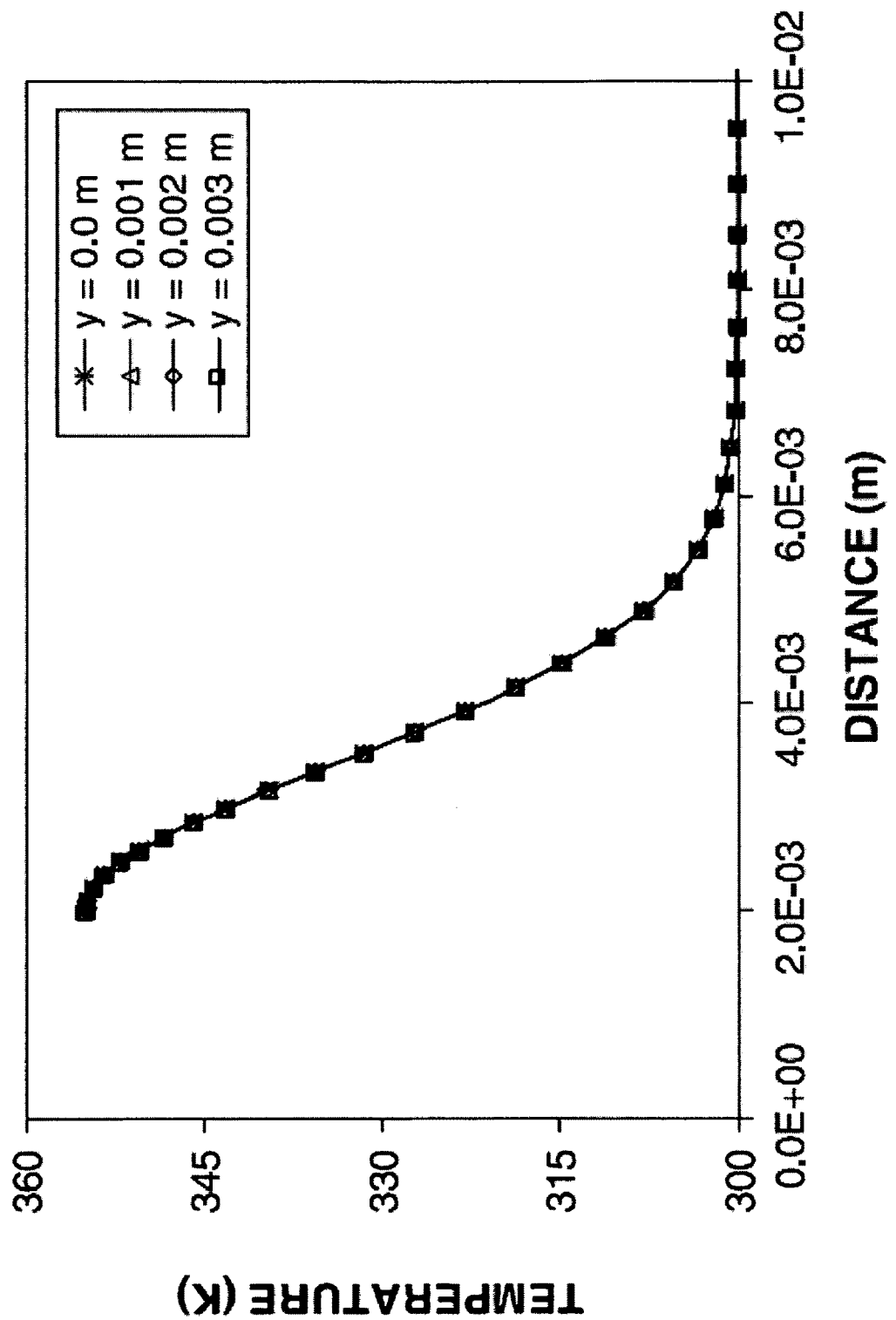
FIG. 4 is a graph illustrating temperature distribution along the x-axis at varying y-axis locations following completion of the laser cutting.

FIG. 3 shows the 3D distribution of temperature around the hole after completion of the cutting process. It is evident that the temperature around the hole surface is approximately 360 K and reduces sharply in the neighborhood of the hole surface. This situation is also seen in FIG. 4, which shows the temperature distribution along the axial location and at the z-axis location corresponding to point B after completion of cutting. Temperature decays sharply with increasing distance from the hole circumference. Moreover, temperature profiles

TABLE II

| | T (K) | | | | | | | | | |
|---|---|---|---|---|---|---|---|---|---|---|
| | 294 | 366 | 422 | 477 | 533 | 589 | 644 | 700 | 755 | 811 | 866 |
| E (Gpa) | 203 | 199 | 195 | 191 | 188 | 184 | 176 | 167 | 154 | 141 | 124 |

| | T (K) | | | | | | | | |
|---|---|---|---|---|---|---|---|---|---|
| | 373 | 473 | 573 | 673 | 773 | 873 | 973 | 1073 | 1273 |
| $\alpha \times 10^{-6}$ (1/K) | 11.2 | 12.1 | 13.0 | 13.6 | 14.0 | 14.6 | 14.8 | 11.8 | 13.6 |

| | T (K) | | | | | | | | | |
|---|---|---|---|---|---|---|---|---|---|---|
| | 273 | 373 | 473 | 573 | 673 | 773 | 873 | 973 | 1073 | 1273 | 1473 |
| K (W/m K) | 51.9 | 50.7 | 48.2 | 45.6 | 41.9 | 38.1 | 33.9 | 30.1 | 24.7 | 26.8 | 29.7 |

| | T (K) | | | | | | | | | |
|---|---|---|---|---|---|---|---|---|---|---|
| | 373 | 473 | 523 | 573 | 673 | 773 | 873 | 973 | 1073 | 1173 |
| $C_p$ (J/kg K) | 486 | 515 | 528 | 548 | 586 | 649 | 708 | 770 | 624 | 548 | at different y-axis locations remain the same because of the assumption of the constant-temperature heat source along the y-axis at the hole surface. It should be noted that the hole cutting is started at point A (FIG. 1B) and ends at the same point after completion of a circular cut. Moreover, point C is the reflection of point A (180° inverted from point A). Once the cutting is complete, temperature reduces to 360 K at point C at the hole surface.

Figure 5:
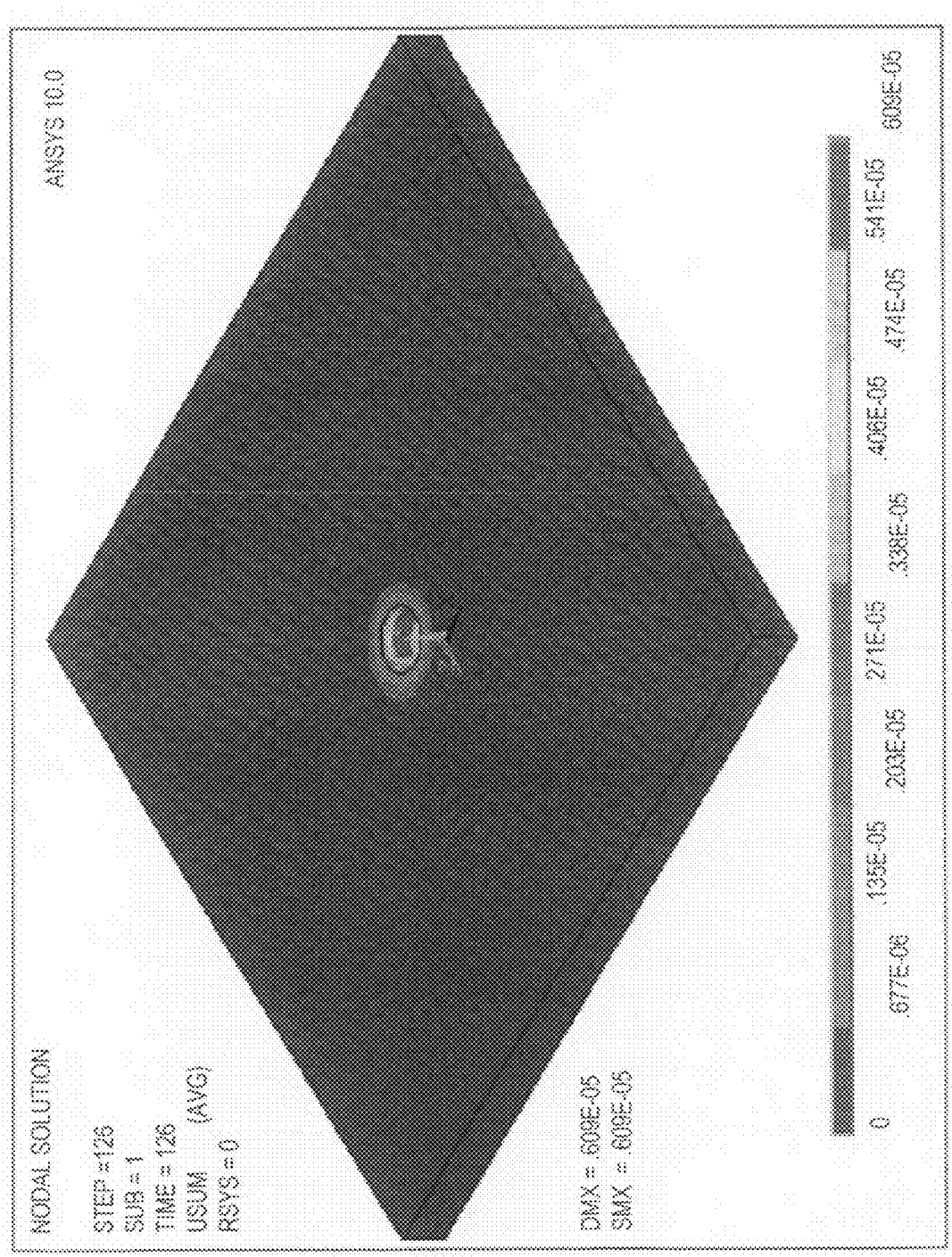
FIG. 5 illustrates thermal displacement about the laser-cut hole surface following completion of the laser cutting.
Figure 6A:
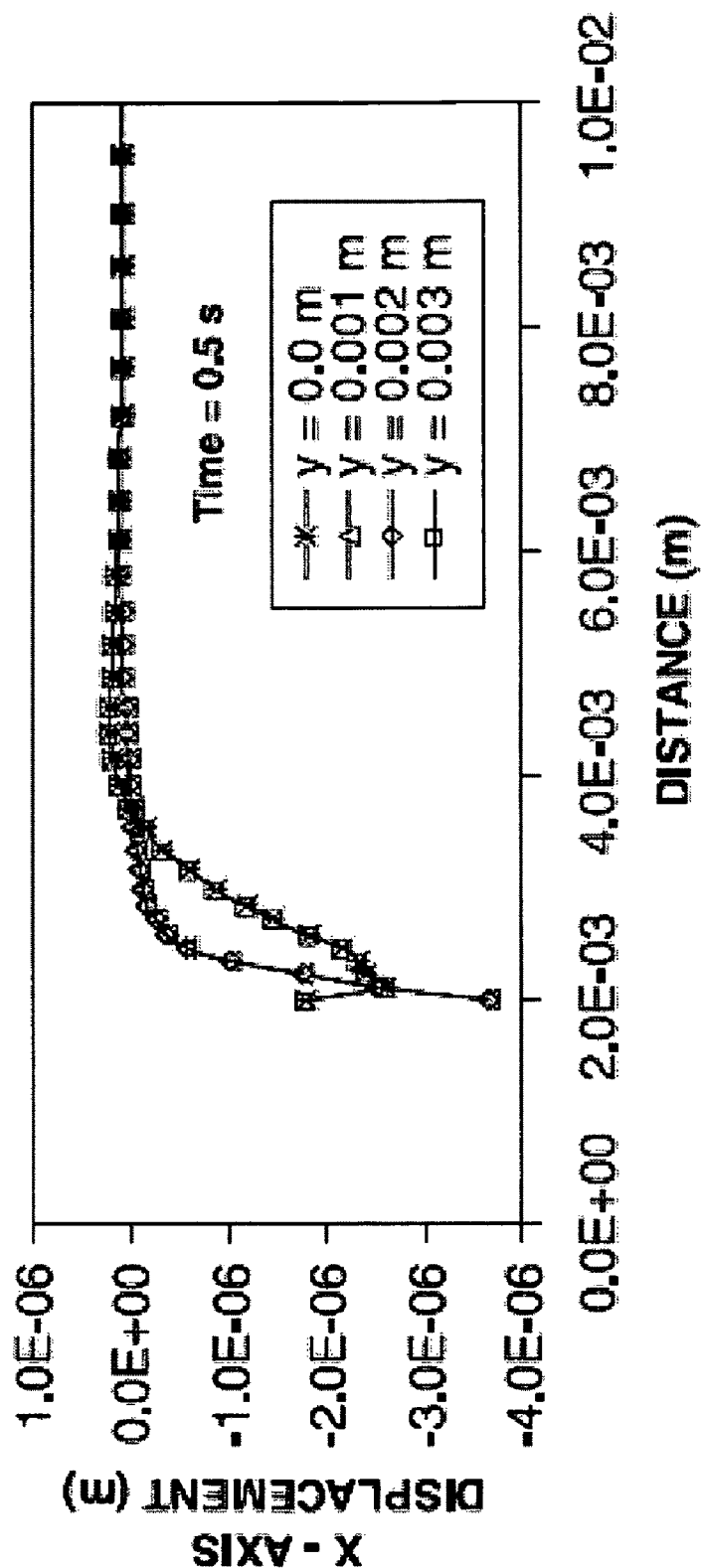
FIGS. 6A, 6B and 6C illustrate thermal displacement of the laser-cut surface at differing y-axis locations following the cutting process.
Figure 6B:
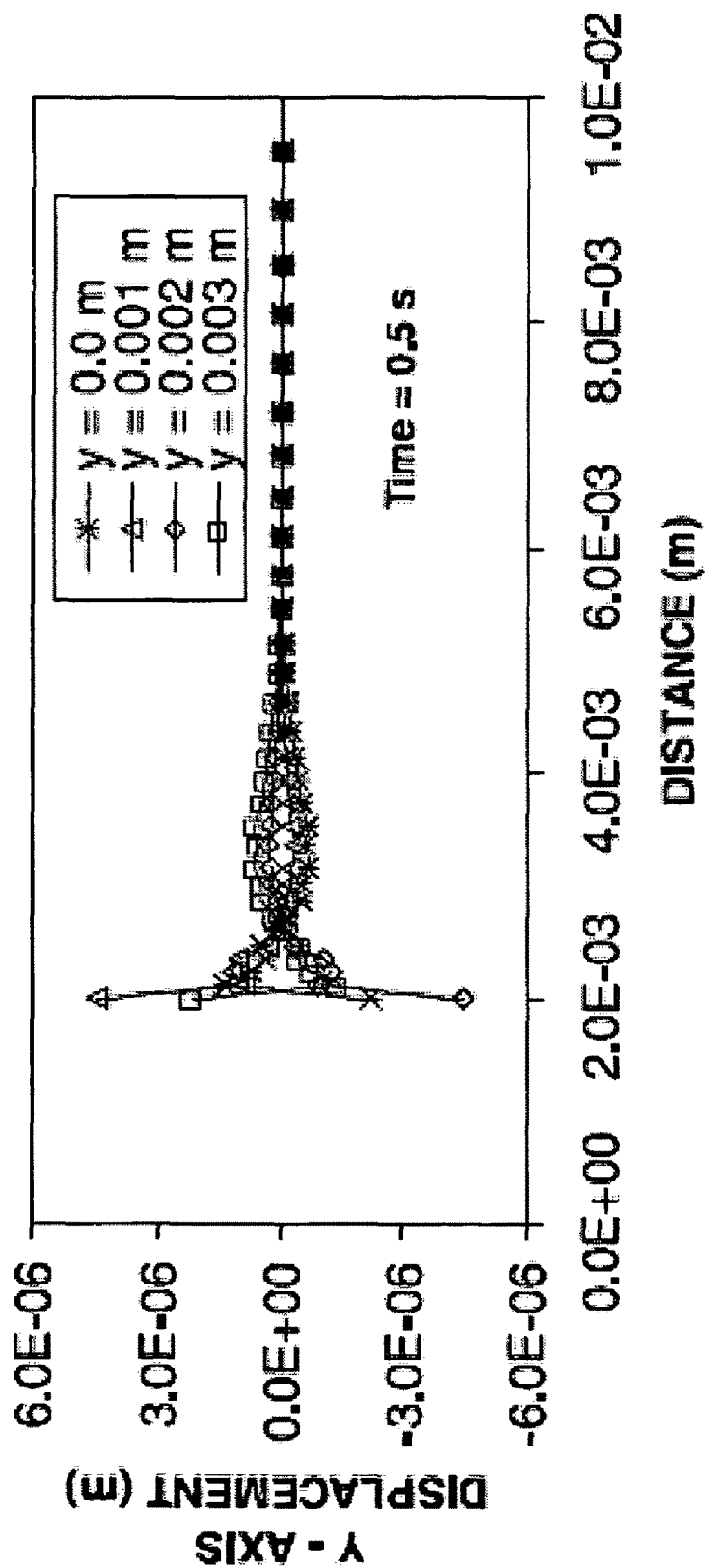
Figure 6C:
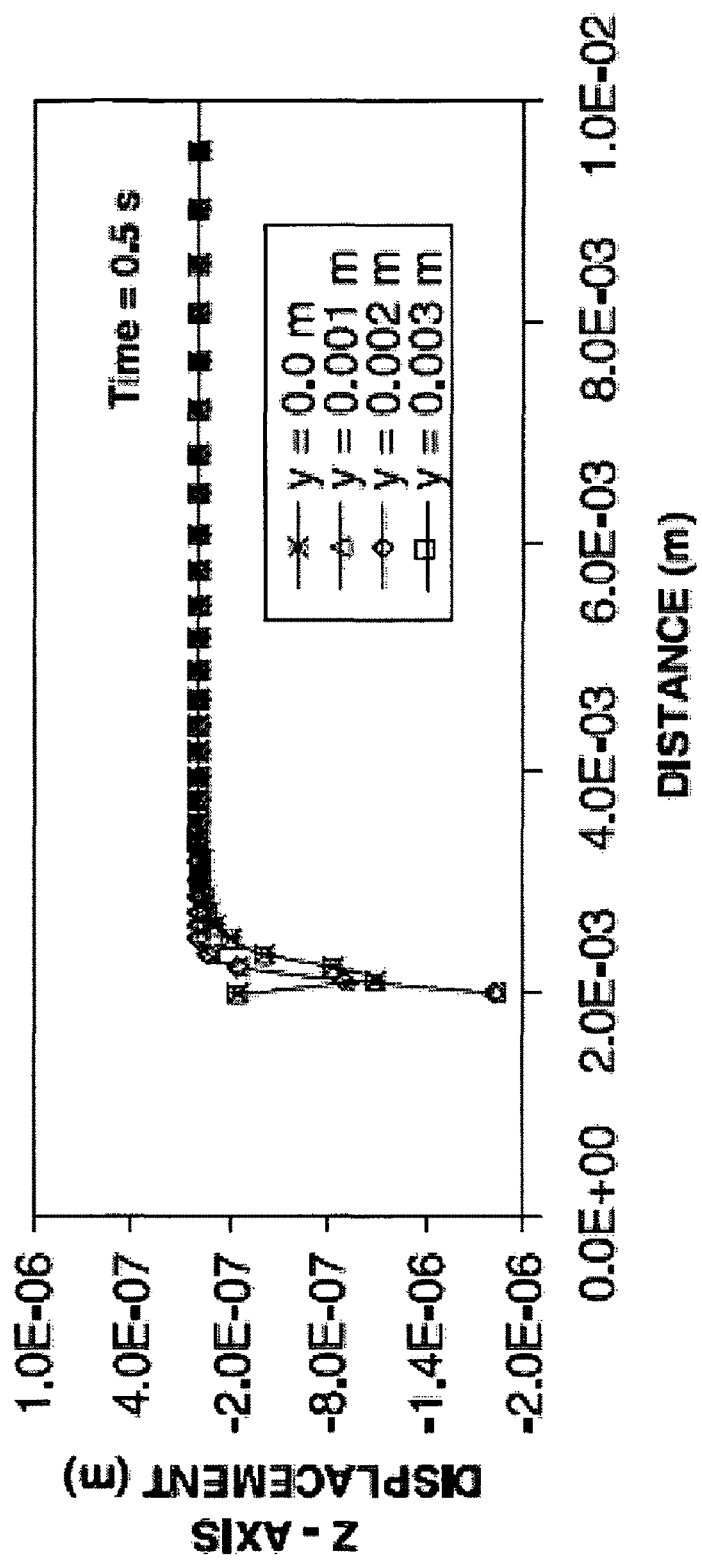
Figure 7A:
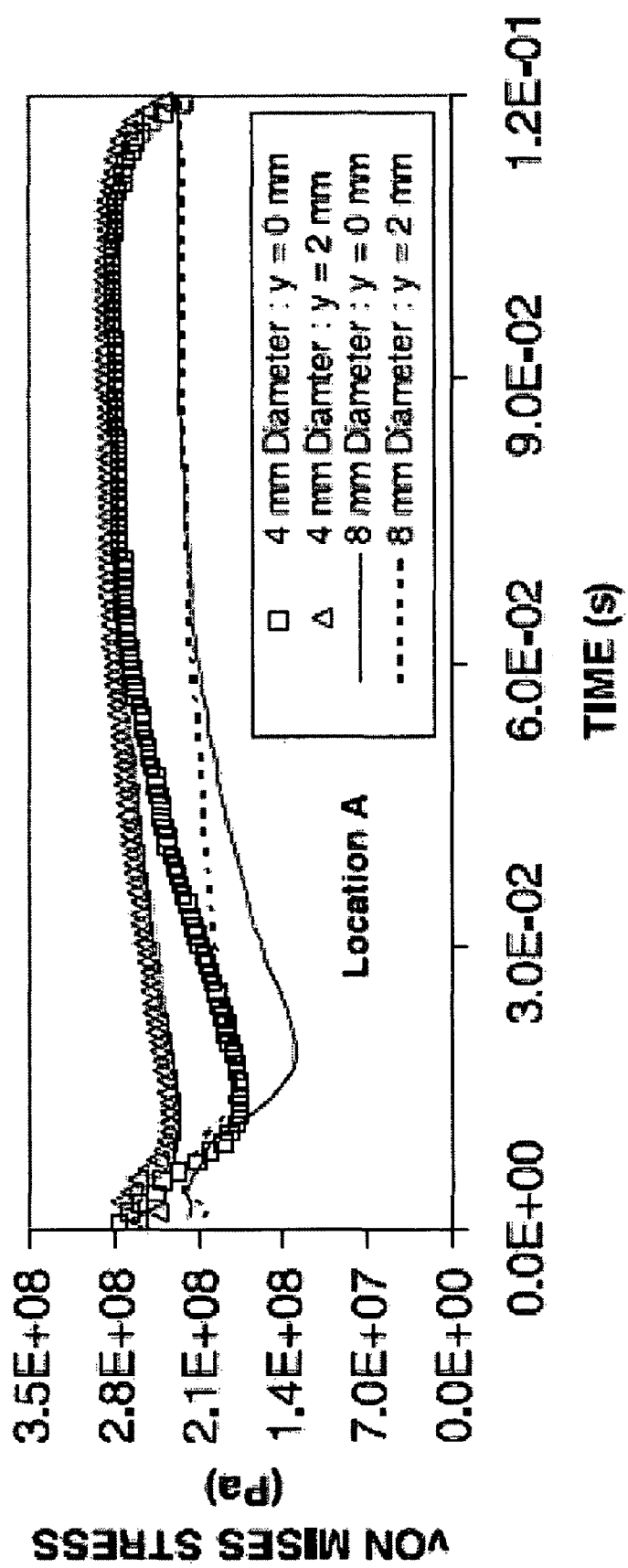
FIGS. 7A, 7B, 7C and 7D illustrate temporal variations of von Mises stress at differing locations about the cut hole edge for two differing hole diameters.
Figure 7B:
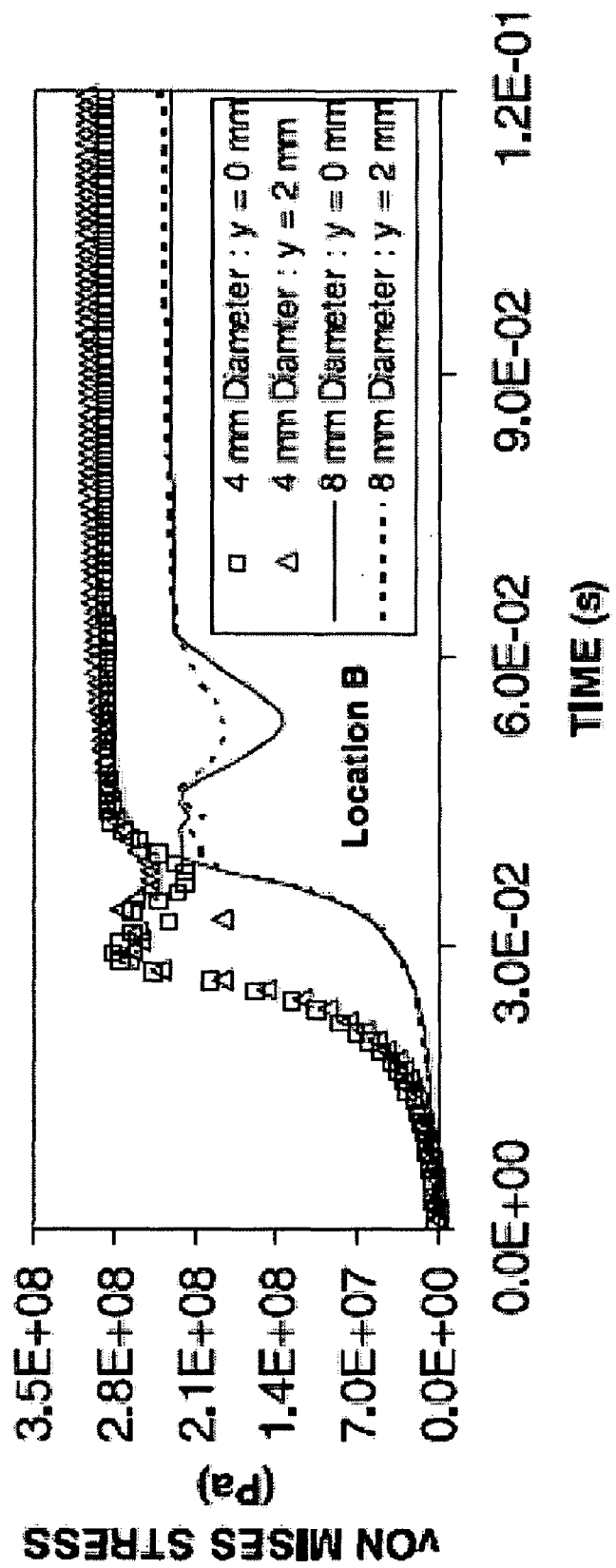
Figure 7C:
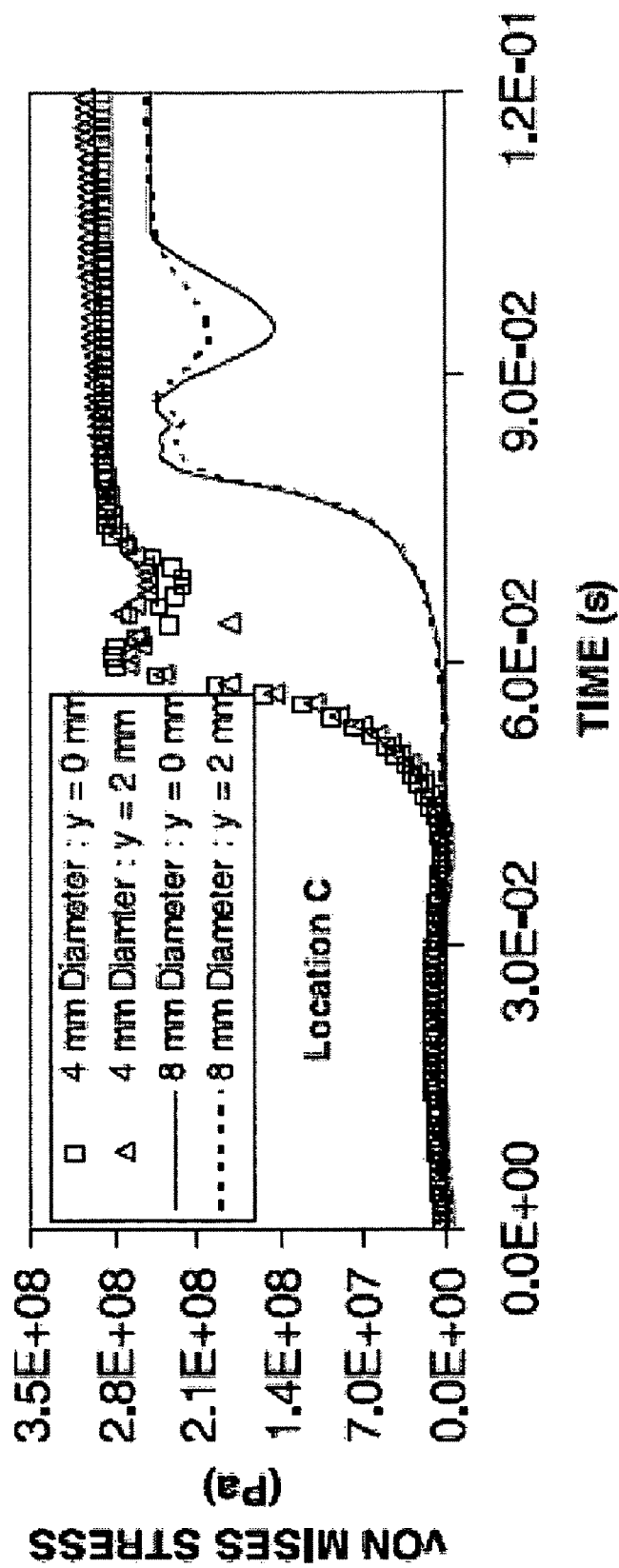
Figure 7D:
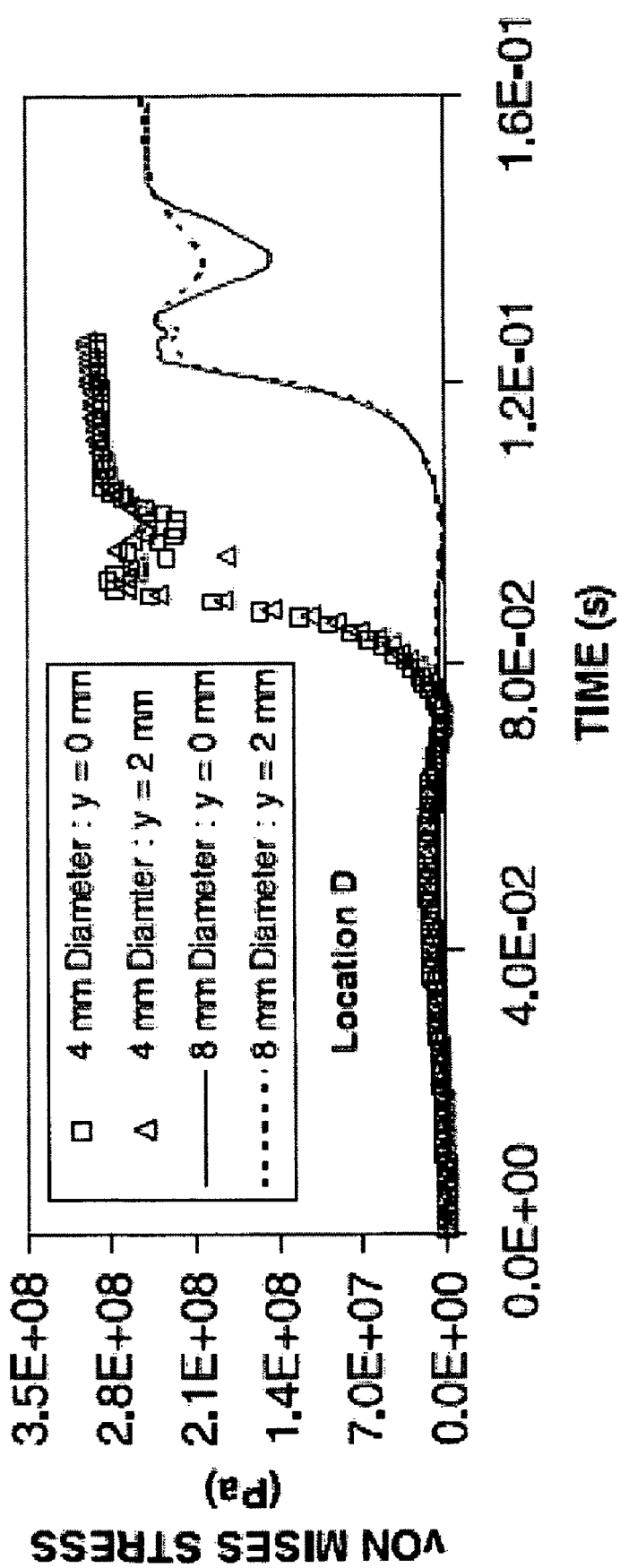

FIG. 5 shows the 3D view of the thermal displacement around the hole surface once cutting is complete, while FIGS. 6A, 6B, 6C shows the x, y, and z-axis displacements, respectively. It can be clearly observed that the maximum displacement is at the surface of the cut, where the x- and y-axis displacements are negative. This is true for all of the y-axis locations along the cut surface. This indicates that the thermal displacement of the material results in compression along the x and y-axes. In the case of the y-axis displacement, depending on the y-axis location, the thermal displacement is either positive or negative; i.e., at the locations y=0 and y=0.003 m, where the free surface of the specimen is located, the displacement is positive. However, at the other y-axis locations, the displacement becomes negative, indicating thermal compression of the cut surface, with the magnitude of the displacement being on the order of micrometers.

FIGS. 7A, 7B, 7C and 7D show the temporal variation of the von Mises stress at different locations on the cut surface for two y-axis locations and two hole diameters. In the case of the 4 mm diameter hole, at location A (where cutting is initiated) the von Mises stress remains high at the y-axis location of y=2 mm. However, at the surface (y=0 m) it reduces, reaches a minimum, and then increases as time progresses. This behavior is also observed at the other locations (B, C, and D). This can be attributed to the thermal strain developed in the substrate material. The magnitude of the von Mises stress rises sharply, reaching a maximum at points B, C, and D, and remains high with progressing time. It should be noted that the initiation of the rise of von Mises stress occurs when the line heat source, representing the laser beam, reaches the respective points at the circumference of the hole. Comparing the stress levels at each location (A, B, C, D) around the holes of 4 mm and 8 mm diameter, it can be observed that the von Mises stress level behaves almost the same for the two hole diameters, although it attains relatively lower values for the 8 mm diameter hole as compared with the 4 mm diameter hole. This situation is true for all locations around the hole edge. Therefore, increasing the hole diameter results in the attainment of lower von Mises stress around the hole edges; i.e., the reduction in von Mises stress is within 12%.

Figure 8A:
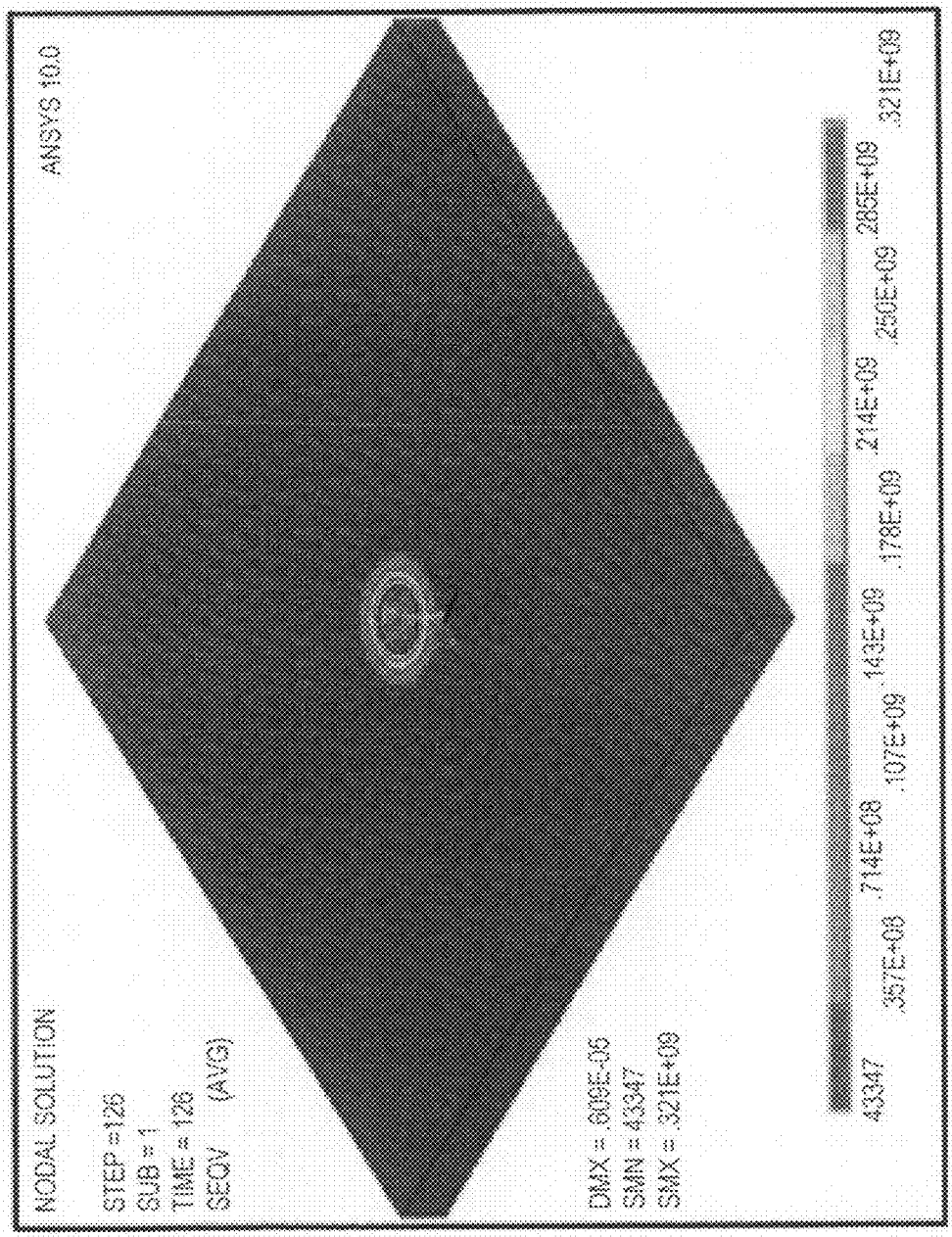
FIGS. 8A and 8B illustrate von Mises stress about the cut hole following the laser cutting process.
Figure 8B:
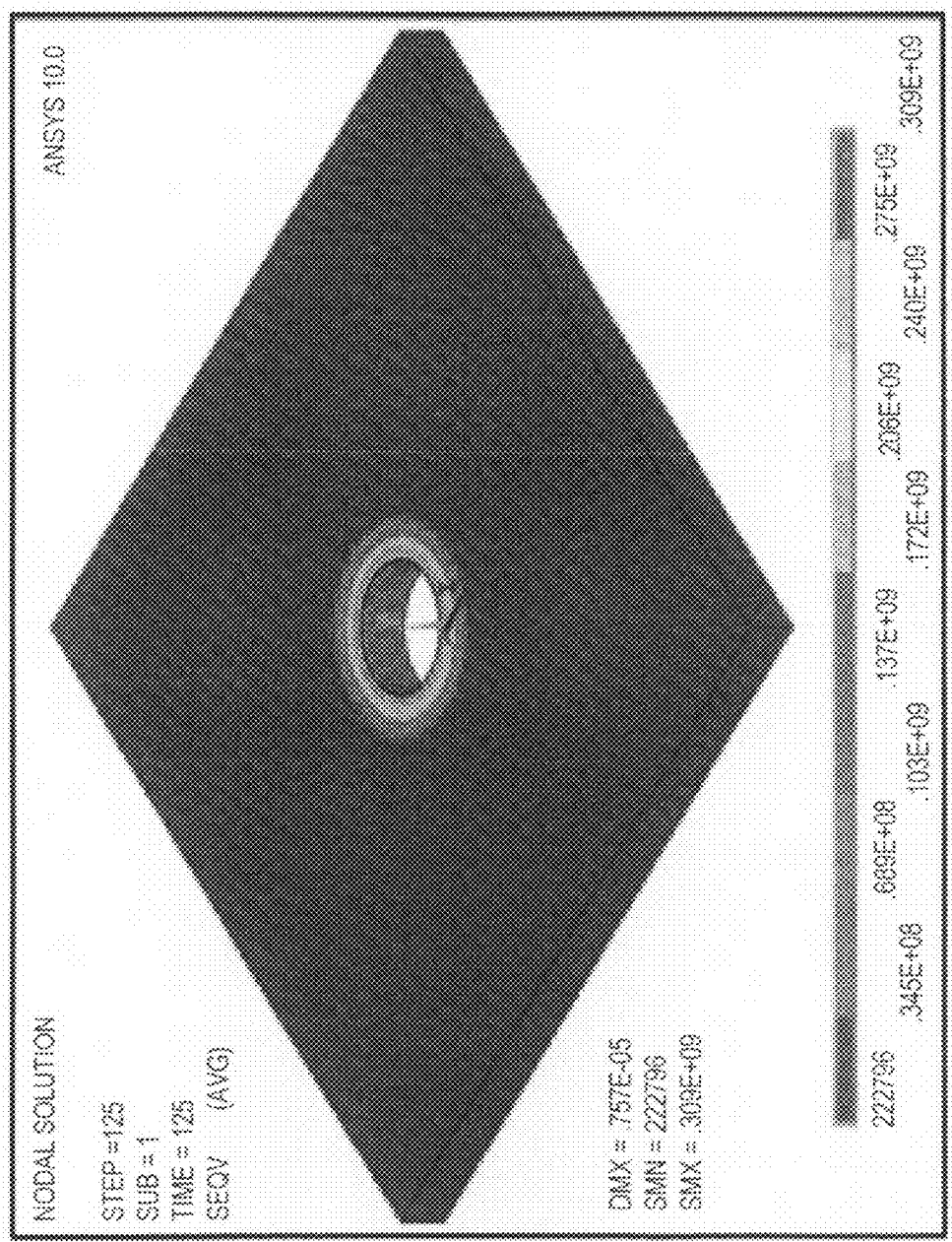
Figure 9:
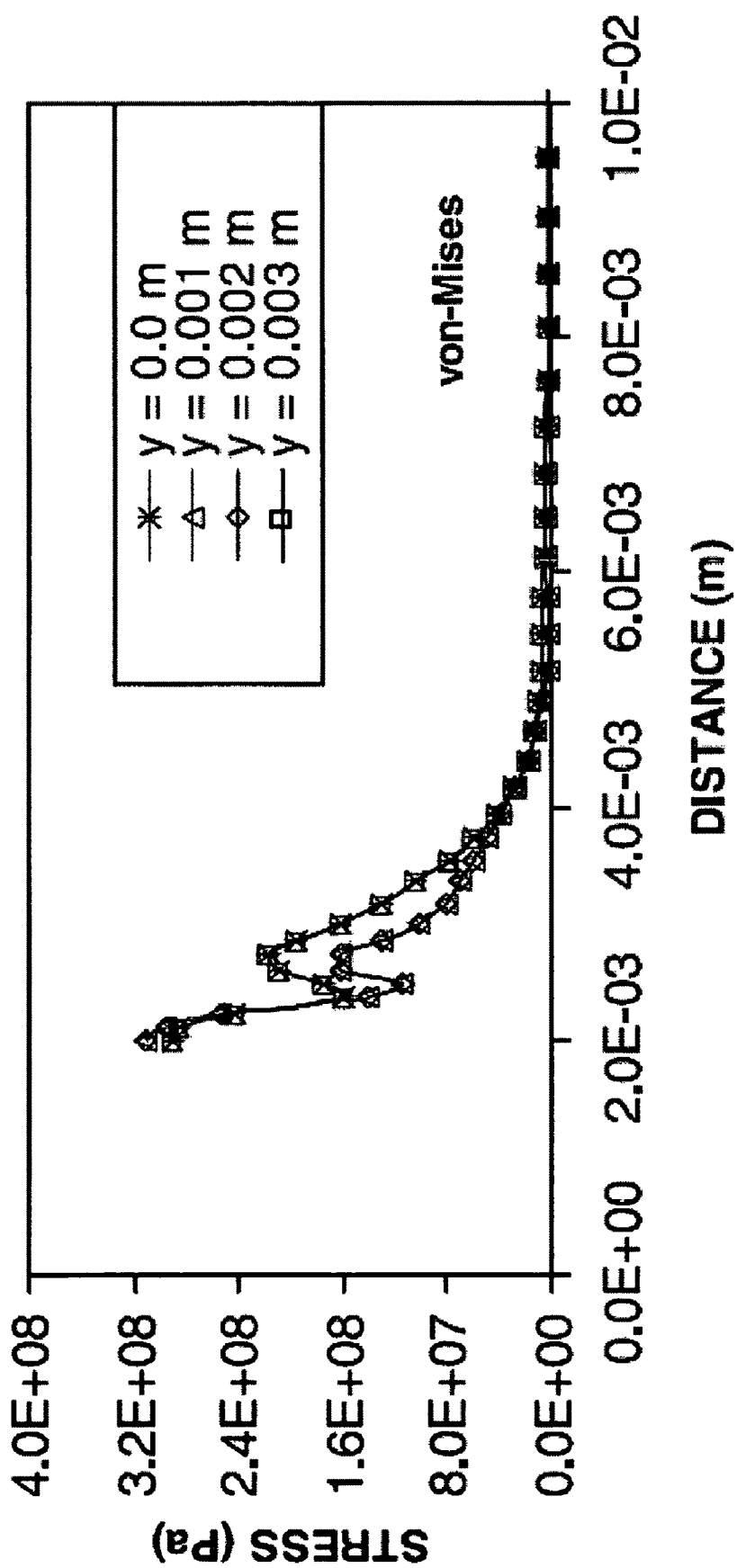
FIG. 9 is a graph showing the von Mises stress along the x-axis at differing y-axis locations following the laser cutting.

FIGS. 8A and 8B show the 3D view of the von Mises stress around the hole at the completion of hole cutting for the two hole diameters, while FIG. 9 shows the von Mises stress distribution along the x-axis and the z-axis location at point B, which is 180° off from the initiation of the cutting (point A), for a 4 mm diameter hole. Further, the time for the plot is 0.1256 s, which corresponds to the end of the duration of the complete hole cutting. Temperature around the hole surface is on the order of 360 K (FIG. 3); after this time, the von Mises stress represents the residual stress developed around the hole surface. In the vicinity of the cut surface, the residual stress attains high values and reduces sharply with increasing distance. However, in the neighborhood of the cut surface, the residual stress attains local minima. This is because of the strain developed in this region; i.e., the thermal expansion of the hole surface results in the small thermal strain in this region. Table III shows the residual stress measured by the XRD technique and predicted by the simulations for the two hole diameters. It is found that both results are in agreement; i.e., the residual stress predicted for 4 mm hole diameter is on the order of 320 MPa, while the value measured is 290 MPa. In addition, the residual stress measured is 210 MPa for the 8 mm hole diameter and the predicted value is 230 MPa, a difference of 11%. It should be noted that the shift in the angle ψ in the XRD chart is used to obtain the residual stress (equation (1)), which is the equivalent stress (von Mises stress).

TABLE III

|  | 4 mm. diameter hole | 8 mm. diameter hole |
|---|---|---|
| Modeled Prediction | 320 MPa | 210 MPa |
| XRD Technique | 290 MPa | 230 MPa |

Figure 10A:
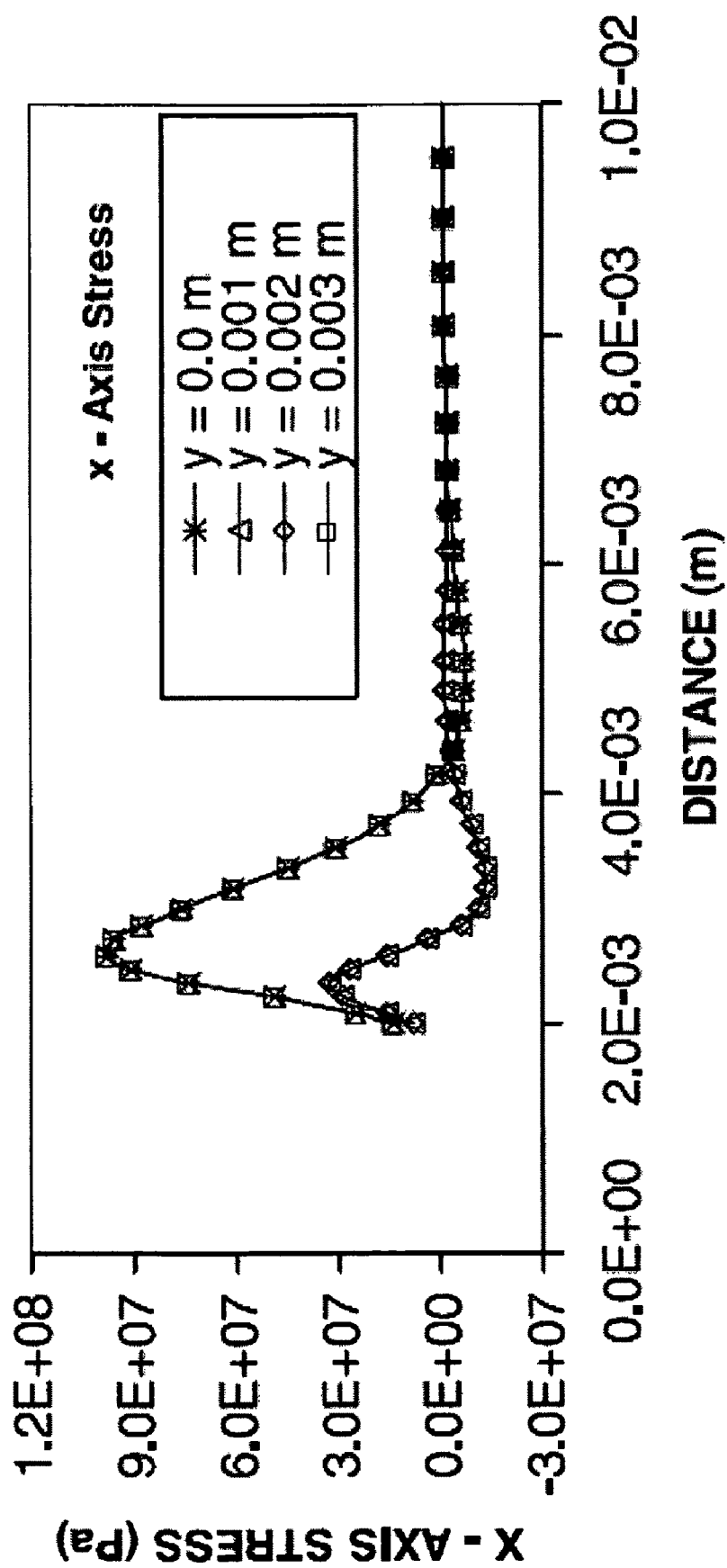
FIGS. 10A, 10B and 10C illustrate the principle stress components along the x-axis at differing y-axis locations following the laser cutting.
Figure 10B:
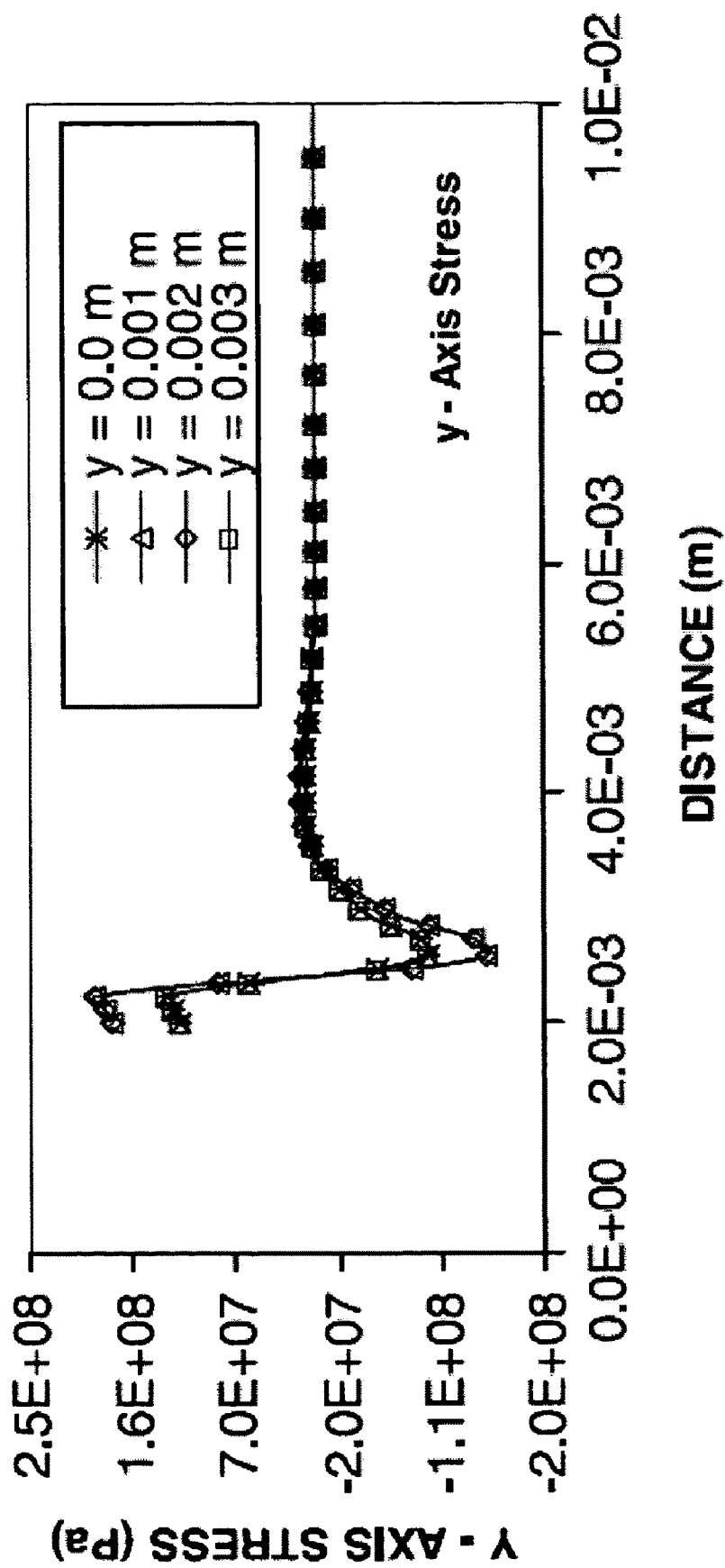
Figure 10C:
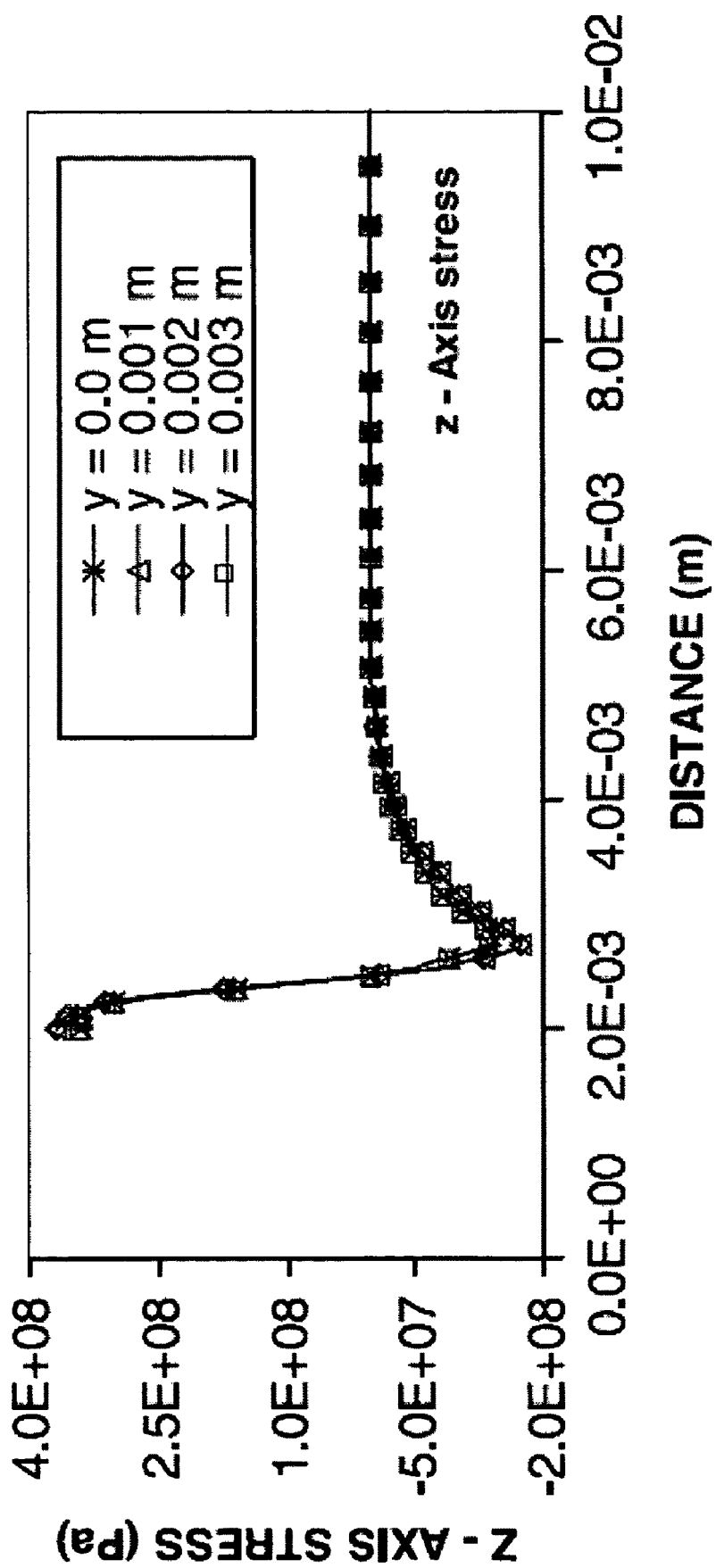

FIGS. 10A, 10B and 10C show the principal stresses (x, y, and z-axis stresses, respectively) along the axial distance after completion of the cutting process. The x-axis stress component in the surface region (at y=0.03 m) and in the bottom region (y=0 m) of the specimen is tensile; however, it is partially tensile and partially compressive at the other y-axis locations, y=0.001 m and y=0.002 m. The tensile part of the stress component occurs close to the hole surface; however, with increasing distance away from the surface towards the solid bulk, it becomes compressive. The location of the maximum stress component differs along the x-axis as the y-axis location changes. Consequently, the maximum tensile stress occurs away from the cut circumference while it is close to the cut circumference at y-axis locations y=0.001 m and y=0.002 m. In the case of the y-axis stress component, it is tensile in the region close to the hole surface and becomes compressive with increasing distance towards the solid bulk. The maximum y-axis stress occurs in the vicinity of the hole surface and decays sharply, reaching a minimum with small increase of distance along the x-axis. The stress component attains high values for the y-axis locations y=0.001 m and y=0.002 m.

In the case of the z-axis stress component, the behavior is similar to the y-axis stress component, although the location and magnitude of the maximum and the minimum stress differ from that of the y-axis stress component. Moreover, for all y-axis locations (y=0 to 0.003 m), the stress component behavior is almost the same, as are their values. The stress component in the region close to the hole surface is tensile, while some distance away from the hole surface it becomes compressive. When comparing the x, y, and z-axis stress components, it is evident that the z-axis stress component has the highest maximum and minimum stress magnitudes, which has the determining role for the maximum and minimum von Mises stress magnitudes. In addition, all of the stress components are tensile in the region close to the hole surface.

Figure 11A:
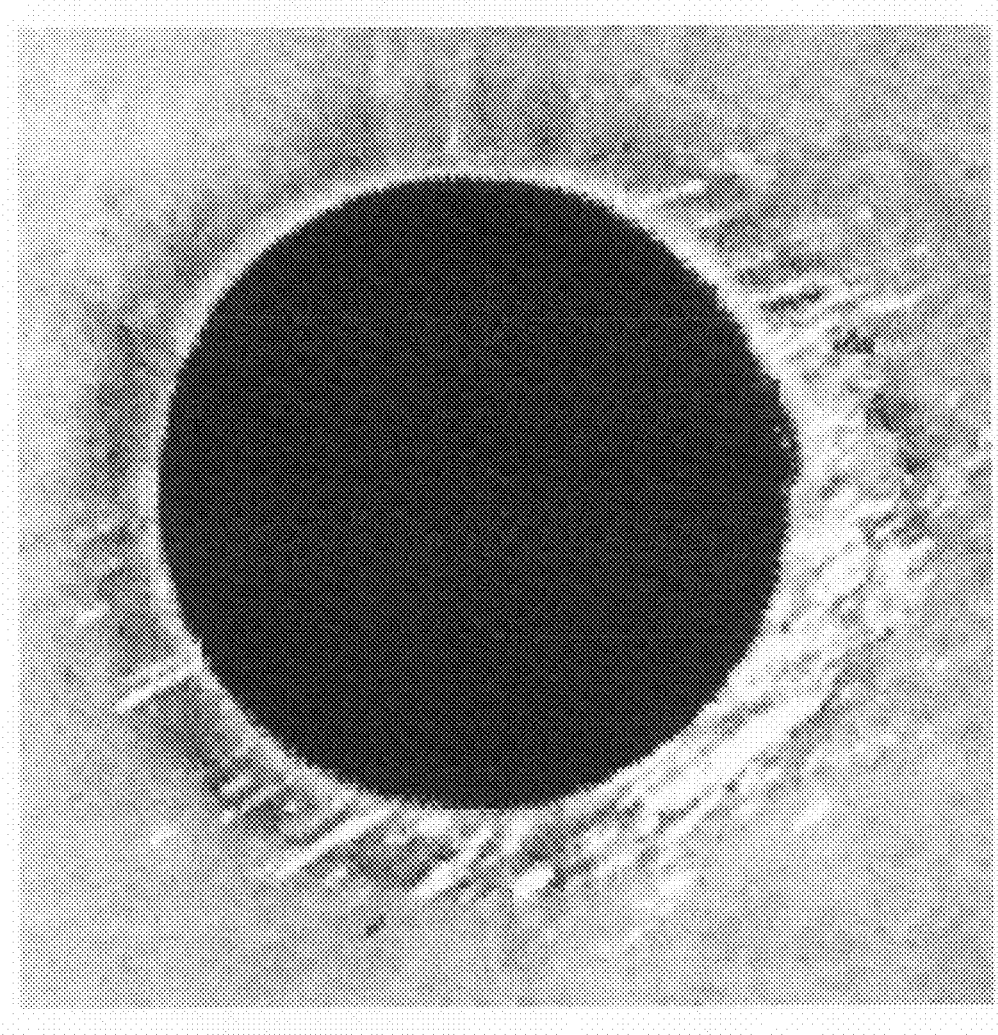
FIG. 11A is an electron micrograph illustrating a top view of the laser-cut hole.
Figure 11B:
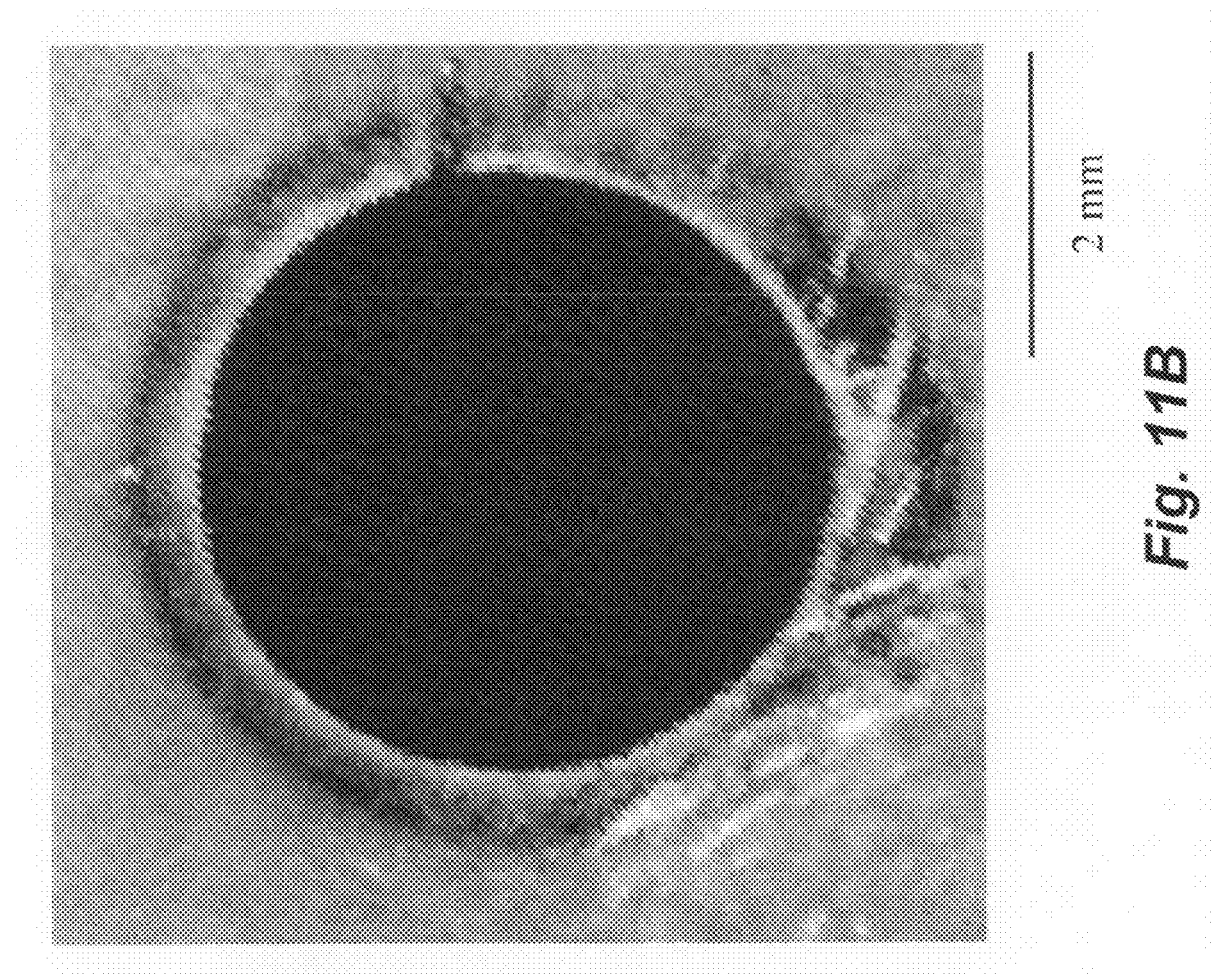
FIG. 11B is an electron micrograph illustrating a bottom view of the laser-cut hole.
Figure 11C:
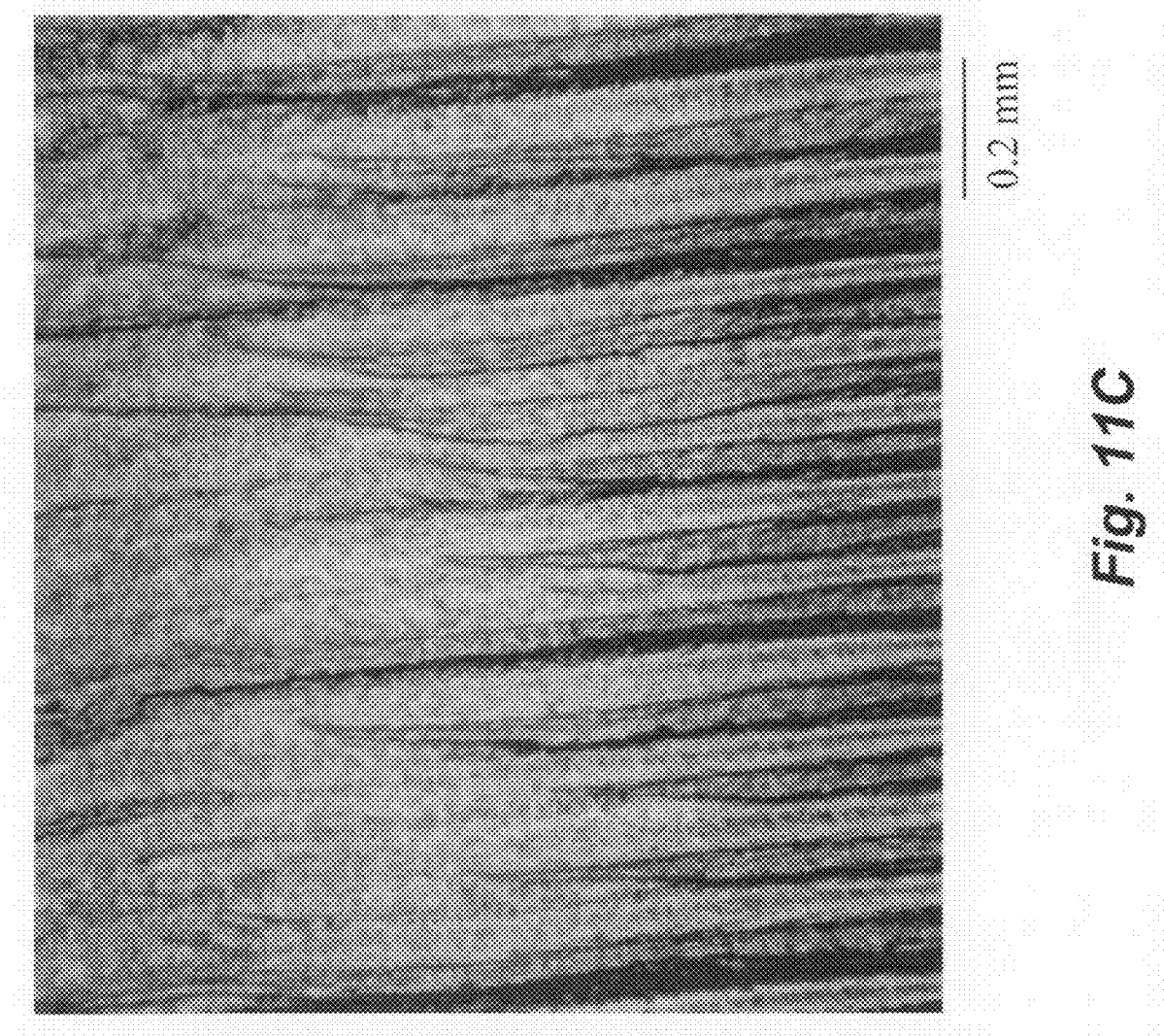
FIG. 11C is an electron micrograph illustrating the cut surface of the laser-cut hole.
Figure 12:
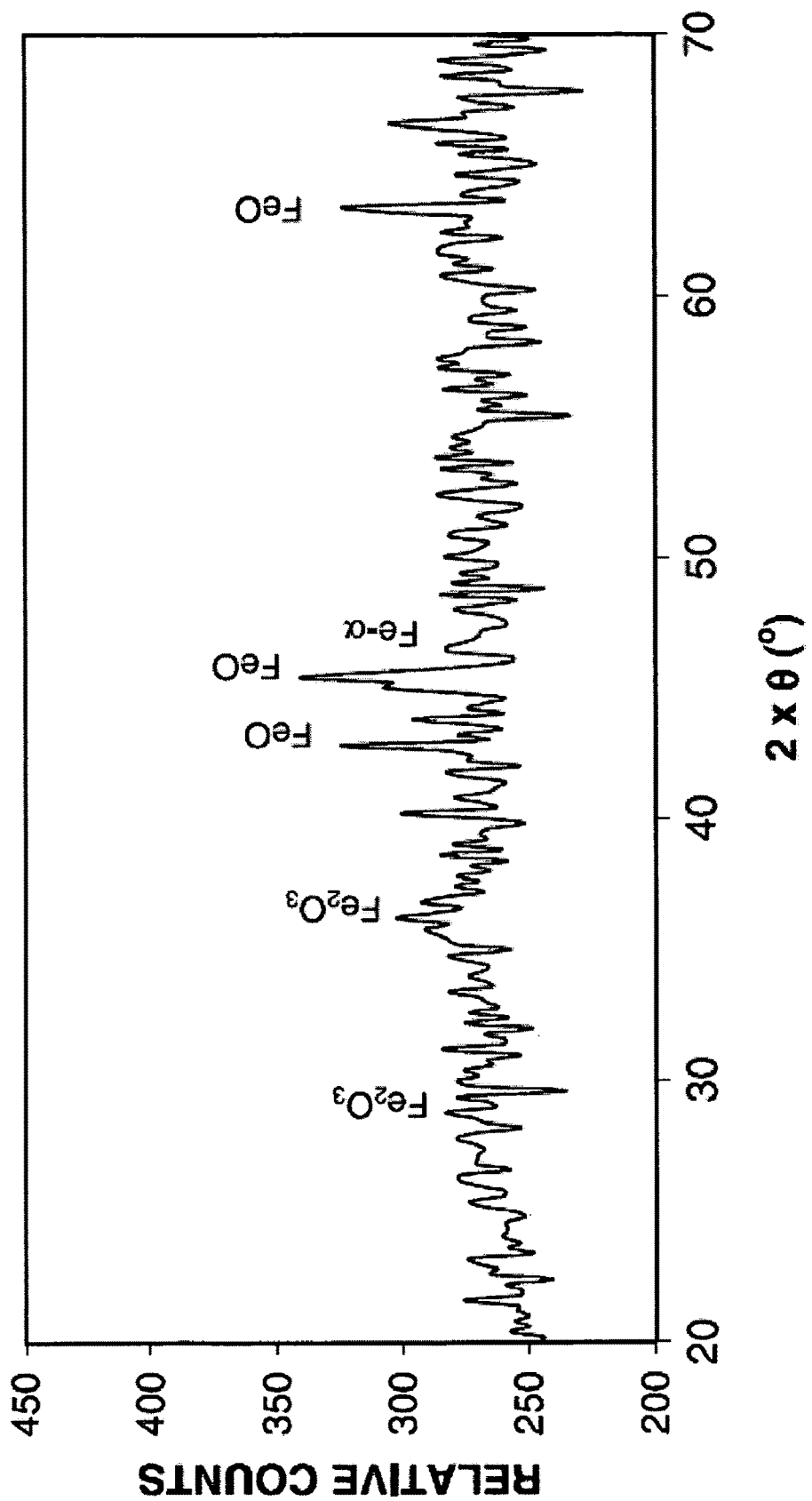
FIG. 12 is a graph illustrating experimental X-ray diffraction results corresponding to the laser-cut surface.

FIGS. 11A, 11B and 11C show optical micrographs of the top and bottom of the laser-cut hole for the 4 mm diameter hole, as well as the cut surface of the hole, respectively. It can be observed that the top surface of the cut hole is almost free from dross and sideways burning. However, some small dross attachment and locally distributed fine sideways burning are evident at the bottom surface. This is attributed to the shielding effects of the assisting gas, which has relatively lower pressure at the bottom surface than that of the top surface. Consequently, the insufficient nitrogen shielding in the bottom region results in partial oxidation at the kerf surface in this region. Moreover, the molten metal ejected from the kerf bottom is responsible for the local sideways burning. However, the size of the thermal erosion in this region is small. A scanning electron micrograph of the cut surface is shown in FIG. 11C. The stria formation is evident; however, the sizes of the stria depth and length are small. Close examination of the micrograph reveals that there is no microcrack formed at the cut surface. This is mainly because of the residual stress developed at the vicinity of the cut surface, which is much less than the yielding limit of the substrate material. Consequently, the plastic deformation due to thermal expansion in the neighborhood of the cut surface does not result in crack formation in this region. Although iron oxides formed at the surface of the melt layer (shown in FIG. 12) solidify rapidly and in some cases form surface cracks at the cut surface, this situation is not observed in the present case.

In the above, laser hole cutting was modeled, and the temperature as well as the stress fields developed during and after the cutting process were examined. The finite element method was used to simulate the cutting conditions and an experiment resembling the simulation conditions was carried out, where the residual stress in the cut surface was measured using the XRD technique and compared with the predictions. It was found that the temperature decays sharply once the heat source passes the cut section along the circumference of the hole. The temperature gradient remains high in the vicinity of the hole circumference during the cutting process and becomes almost uniform around the circumference once the cutting process is completed. The principal stresses around the hole circumference attain high values in the vicinity of the surface. The stress components are tensile in this region, but all of the principal stresses become compressive as the distance from the hole surface increases towards the solid bulk. This is more pronounced at the y-axis locations y=0.001 m and y=0.002 m. The magnitude of the z-axis principal stress is higher than that of the x and y-axes. Consequently, the z-axis stress is the main contributor to the von Mises stress.

The von Mises stress attains high values in the vicinity of the hole circumference and makes local minima in the neighborhood of the hole circumference. Moreover, as the distance from the hole surface towards the solid bulk increases, the von Mises stress first increases and then decays gradually. Once the cutting process is completed, the temperature around the hole reduces to 360 K and the von Mises stress after this period is considered as the residual stress. Comparison of the residual stress measured from the XRD technique with that predicted from the simulations indicates that both results are in agreement. In addition, the influence of hole diameter on the von Mises stress is found to be considerable, in which case, increasing the hole diameter reduces the von Mises stress around the cut edges.

Figure 13:
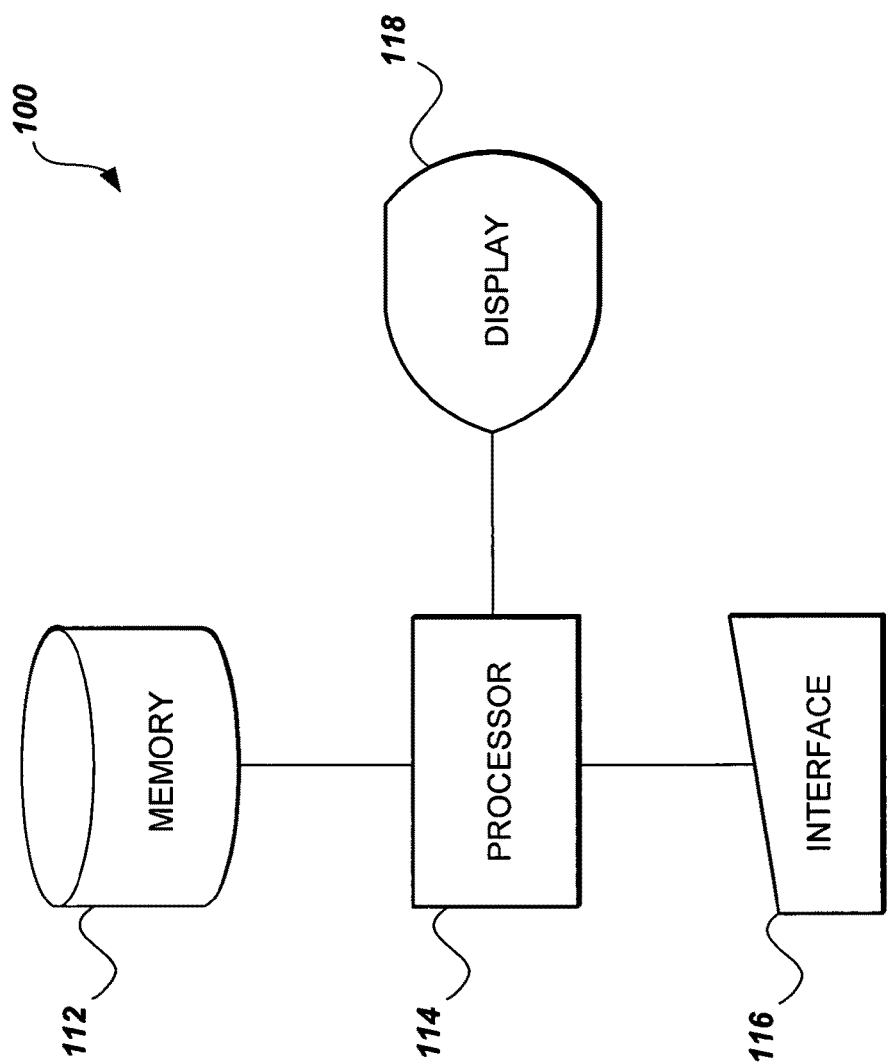
FIG. 13 diagrammatically illustrates a system for implementing the method of modeling residual stresses during laser cutting according to the present invention.

In the above, the calculations may be performed by any suitable computer system, such as that diagrammatically shown in FIG. 13. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

The method may be implemented in software in any suitable software language, including C, C++, Visual C, Visual C++, Visual Basic, Java, FORTRAN, etc. The software program may be stored on any computer readable medium, including a floppy disc, a hard disk, a CD-ROM, a DVD, punch cards, a laser disk, or any optical or magnetic media for storing a computer software program in such a form that the instructions may be retrieved and executed by a processor.

It is to be understood that the present invention is not limited to the embodiments described above, but encompasses any and all embodiments within the scope of the following claims.

We claim:

1. A computerized method of modeling residual stresses during laser cutting, comprising the steps of:

establishing a set of variables u, t, T, x, y, z, $\rho$, $C_p$, $K_{xx}$, $K_{yy}$ and $K_{zz}$, wherein the variable t represents time, the variable T represents temperature, the variables x, y and z represent Cartesian axes, $\rho$ represents a density of a substrate material, $C_p$ represents a specific heat capacity of the substrate material, u is a scanning speed of a laser beam used to cut the substrate material, and $K_{xx}$, $K_{yy}$ and $K_{zz}$ respectively represent thermal conductivities of the substrate material along the x, y and z-axes;

calculating temperature variation in the substrate material due to laser cutting as:

$$\rho \frac{\partial (C_p T)}{\partial t} = \left[ \frac{\partial}{\partial x}\left(K_{xx}\frac{\partial T}{\partial x}\right) + \frac{\partial}{\partial y}\left(K_{yy}\frac{\partial T}{\partial y}\right) + \frac{\partial}{\partial z}\left(K_{zz}\frac{\partial T}{\partial z}\right) \right] + \rho u \frac{\partial (C_p T)}{\partial y};$$

establishing boundary conditions for the calculation of temperature variation;

applying a Fourier heat model to a differential control volume such that $$\rho \frac{\partial (C_p T)}{\partial t} + \{L\}^T \{q\} = u \frac{\partial}{\partial y}(\rho C_p T),$$

wherein $$\{L\} = \left\{ \begin{array}{c} \frac{\partial}{\partial x} \\ \frac{\partial}{\partial y} \\ \frac{\partial}{\partial z} \end{array} \right\}$$

is a vector operator and $\{q\}$ is a heat flux vector, wherein $\{q\} = -[D]\{L\}^T$, where $$[D] = \begin{bmatrix} K_{xx} & 0 & 0 \\ 0 & K_{yy} & 0 \\ 0 & 0 & K_{zz} \end{bmatrix};$$

setting $K_{xx}$, $K_{yy}$ and $K_{zz}$ equal to a constant thermal conductivity K such that $$\frac{\partial}{\partial t}(\rho C_p T) = \{L\}^T [[D]\{L\}T] + u\frac{\partial}{\partial y}(\rho C_p T);$$

calculating a strain energy due to thermal stresses within the substrate material as $\{\delta u\}^T \int_{vol} [B]^T [D][B] dv \{u\} = \{\delta u\}^T \int_{vol} [B]^T [D][\epsilon^{th}] dv$, wherein $\{\delta u\}^T$ is a vector representing a set of arbitrary virtual displacements, $[\epsilon^{th}]$ represents a thermal strain vector, [B] is a strain-displacement matrix and v represents a differential volume, wherein calculation of temperature variation and strain energy in the substrate material due to laser cutting is performed by discretization; and displaying numerical results of the calculated temperature variation and strain energy in the substrate material due to laser cutting.

2. The computerized method of modeling residual stresses during laser cutting as recited in claim 1, wherein the boundary conditions for the calculation of temperature variation are set as $\{q\}^T\{\eta\}=h(T_s-T_0)$, wherein $\{\eta\}$ is a unit outward vector normal to a surface of the substrate material, h is a heat transfer coefficient, and $T_s$ and $T_0$ are surface and reference temperatures of the substrate material, respectively.

3. The computerized method of modeling residual stresses during laser cutting as recited in claim 2, wherein the calculation of strain energy includes calculation of $[K]\{u\}=\{F^{th}\}$, wherein $[K]=\int_{vol}[B]^T[D][B]dv$ and $\{F^{th}\}=\int_{vol}[B]^T[D][\epsilon^{th}]dv$ is an element thermal load vector.

4. The computerized method of modeling residual stresses during laser cutting as recited in claim 3, wherein the thermal strain vector is calculated as $\{\epsilon^{th}\}=\{\alpha\}\Delta T$, where $\{\alpha\}$ is a vector of coefficients of thermal expansion.

5. The computerized method of modeling residual stresses during laser cutting as recited in claim 4, wherein the step of discretization comprises application of the finite element method.

6. A system for performing the method of modeling residual stresses during laser cutting as recited in claim 5, comprising:
  a processor;
  computer readable memory coupled to said processor;
  a user interface coupled to said processor;
  a display coupled to said processor; and
  software stored in the memory and executable by the processor, the software including:
    means for establishing a set of variables u, t, T, x, y, z, $\rho$, $C_p$, $K_{xx}$, $K_{yy}$ and $K_{zz}$, wherein the variable t represents time, the variable T represents temperature, the variables x, y and z represent Cartesian axes, $\rho$ represents a density of a substrate material, $C_p$ represents a specific heat capacity of the substrate material, u is a scanning speed of a laser beam used to cut the substrate material, and $K_{xx}$, $K_{yy}$ and $K_{zz}$ respectively represent thermal conductivities of the substrate material along the x, y and z-axes;
    means for calculating temperature variation in the substrate material due to laser cutting as:

$$\rho\frac{\partial(C_pT)}{\partial t} = \left[\frac{\partial}{\partial x}\left(K_{xx}\frac{\partial T}{\partial x}\right) + \frac{\partial}{\partial y}\left(K_{yy}\frac{\partial T}{\partial y}\right) + \frac{\partial}{\partial z}\left(K_{zz}\frac{\partial T}{\partial z}\right)\right] + \rho u\frac{\partial(C_pT)}{\partial y};$$

means for establishing boundary conditions for the calculation of temperature variation;
    means for applying a Fourier heat model to a differential control volume such that:

$$\rho\frac{\partial(C_pT)}{\partial t} + \{L\}^T\{q\} = u\frac{\partial}{\partial y}(\rho C_pT),$$

wherein $$\{L\} = \left\{\begin{array}{c}\frac{\partial}{\partial x}\\\frac{\partial}{\partial y}\\\frac{\partial}{\partial z}\end{array}\right\}$$

is a vector operator and $\{q\}$ is a heat flux vector, wherein $\{q\}=-[D]\{L\}^T$, where $$[D] = \begin{bmatrix}K_{xx} & 0 & 0\\0 & K_{yy} & 0\\0 & 0 & K_{zz}\end{bmatrix};$$

means for setting $K_{xx}$, $K_{yy}$ and $K_{zz}$ equal to a constant thermal conductivity K such that $$\frac{\partial}{\partial t}(\rho C_pT) = \{L\}^T[[D]\{L\}T] + u\frac{\partial}{\partial y}(\rho C_pT);$$

means for calculating a strain energy due to thermal stresses within the substrate material as:
    $\{\delta u\}^T\int_{vol}[B]^T[D][B]dv\{u\}=\{\delta u\}^T\int_{vol}[B]^T[D][\epsilon^{th}]dv$,
    wherein $\{\delta u\}^T$ is a vector representing a set of arbitrary virtual displacements, $[\epsilon^{th}]$ represents a thermal strain vector, [B] is a strain-displacement matrix and v represents a differential volume, wherein calculation of temperature variation and strain energy in the substrate material due to laser cutting is performed by discretization; and
    means for displaying numerical results of the calculated temperature variation and strain energy in the substrate material due to laser cutting.

\* \* \* \* \*